(12) United States Patent  
Laycock

(10) Patent No.: US 10,852,201 B2
(45) Date of Patent: Dec. 1, 2020

(54) REMOTE SENSING

(71) Applicant: BAE SYSTEMS plc, London (GB)

(72) Inventor: Leslie Charles Laycock, Chelmsford Essex (GB)

(73) Assignee: BAE SYSTEMS plc, London (GB)

( * ) Notice: Subject to any disclaimer, the term of this patent is extended or adjusted under 35 U.S.C. 154(b) by 307 days.

(21) Appl. No.: 16/060,682

(22) PCT Filed: Dec. 5, 2016

(86) PCT No.: PCT/GB2016/053822
§ 371 (c)(1),
(2) Date: Jun. 8, 2018

(87) PCT Pub. No.: WO2017/098222
PCT Pub. Date: Jun. 15, 2017

(65) Prior Publication Data
US 2018/0372554 A1 Dec. 27, 2018

(30) Foreign Application Priority Data

Dec. 9, 2015 (EP) ...................................... 15275258
Dec. 9, 2015 (GB) .................................... 1521702.9

(51) Int. Cl.
*G01K 11/20* (2006.01)
*G01N 21/64* (2006.01)
(Continued)

(52) U.S. Cl.
CPC ........... *G01K 11/20* (2013.01); *G01N 21/643* (2013.01); *G01N 21/645* (2013.01);
(Continued)

(58) Field of Classification Search
CPC ........... G01K 11/20; G01N 2021/1793; G01N 2021/6432; G01N 2021/7786;
(Continued)

(56) References Cited

U.S. PATENT DOCUMENTS 2,407,680 A 9/1946 Palmquist
2,713,286 A 7/1955 Taylor
(Continued)

FOREIGN PATENT DOCUMENTS

EP 2187239 A1 5/2010
GB 1477175 6/1977
(Continued)

OTHER PUBLICATIONS

International Preliminary Report on Patentability received for PCT Application PCT/GB2016/053823, dated Jun. 21, 2018. 8 pages.
(Continued)

*Primary Examiner* — Hina F Ayub
(74) *Attorney, Agent, or Firm* — Finch & Maloney PLLC

(57) ABSTRACT

A system for remotely sensing light emanating from within a monitored environment. The system comprises one or more retro-reflective optical elements bearing an optically reflective optical coating upon a surface thereof and positionable within the environment to be monitored, and a light source arranged to direct a beam of light at the optical element(s). A detector is arranged to receive from the optical element(s) light returned by the optical coating in response to the beam of light and to detect a property of the monitored environment according to said returned light. The optical element includes a body comprising a focuser part of positive optical power partly surrounded by a reflector part separated therefrom and connected thereto across an open spacing. The optical coating is arranged over an outer surface of the reflector part thereat to receive light which has been at least partially converged by the focuser part for subsequent retro-reflection.

20 Claims, 7 Drawing Sheets

(51) Int. Cl.
*G02B 5/128* (2006.01)
*G01N 21/17* (2006.01)
*G01N 21/77* (2006.01)

(52) U.S. Cl.
CPC ......... *G01N 21/6489* (2013.01); *G02B 5/128* (2013.01); *G01N 2021/1793* (2013.01); *G01N 2021/6432* (2013.01); *G01N 2021/7786* (2013.01)

(58) Field of Classification Search
CPC ............... G01N 21/643; G01N 21/645; G01N 21/6489; G02B 5/128
See application file for complete search history.

(56) References Cited

U.S. PATENT DOCUMENTS

| | | | |
|---|---|---|---|
| 3,025,764 | A | 3/1962 | McKenzie |
| 3,700,478 | A | 10/1972 | Bingham |
| 3,919,031 | A * | 11/1975 | White .................... G02B 5/128 156/219 |
| 4,708,494 | A | 11/1987 | Kleinerman |
| 4,996,412 | A | 2/1991 | Anafi et al. |
| 5,670,209 | A | 9/1997 | Wyckoff |
| 5,822,074 | A | 10/1998 | Deason et al. |
| 6,278,100 | B1 | 8/2001 | Friedman et al. |
| 7,336,351 | B1 | 2/2008 | Sweatt et al. |
| 2002/0153497 | A1 | 10/2002 | Pepper et al. |
| 2003/0016368 | A1 | 1/2003 | Aman et al. |
| 2004/0090622 | A1 | 5/2004 | Nielsen et al. |
| 2006/0098272 | A1 | 5/2006 | Lerner et al. |
| 2006/0255292 | A1 | 11/2006 | Ja |
| 2007/0036680 | A1 | 2/2007 | Hobbs et al. |
| 2007/0127030 | A1 | 6/2007 | Shpantzer |
| 2008/0309873 | A1 | 12/2008 | Levecq et al. |
| 2009/0059371 | A1 | 3/2009 | Glembocki et al. |
| 2009/0065583 | A1 | 3/2009 | McGrew |
| 2010/0035043 | A1 | 2/2010 | Bird |
| 2011/0103410 | A1 | 5/2011 | Hutchin |
| 2011/0215229 | A1 | 9/2011 | Laycock et al. |
| 2012/0140224 | A1 | 6/2012 | Switkes et al. |
| 2013/0003056 | A1 | 1/2013 | Piorek et al. |
| 2013/0215510 | A1 | 8/2013 | Gelfant et al. |
| 2015/0279250 | A1 * | 10/2015 | McDaniel ................ B60Q 7/00 362/84 |
| 2017/0276844 | A1 | 9/2017 | McCoy et al. |

FOREIGN PATENT DOCUMENTS

| | | |
|---|---|---|
| GB | 2162713 A | 2/1986 |
| JP | H03273123 A | 12/1991 |
| JP | 2015060202 A | 3/2015 |
| JP | 2015203592 A | 11/2015 |
| WO | 97/23423 | 7/1997 |
| WO | 98/37406 | 8/1998 |
| WO | 0114849 A1 | 3/2001 |
| WO | 2005/022210 A1 | 3/2005 |
| WO | 2005/041450 A1 | 5/2005 |
| WO | 2006/099317 A2 | 9/2006 |
| WO | 2008/139136 A2 | 11/2008 |
| WO | 2010/055325 A1 | 5/2010 |
| WO | 2012/078324 A2 | 6/2012 |
| WO | 2012078324 | 6/2012 |
| WO | 2014/143235 A1 | 9/2014 |
| WO | 2017/098220 A1 | 6/2017 |
| WO | 2017/098221 A1 | 6/2017 |
| WO | 2017/098222 A1 | 6/2017 |
| WO | 2017/098223 A1 | 6/2017 |

OTHER PUBLICATIONS

International Preliminary Report on Patentability received for PCT Application PCT/GB2016/053822, dated Jun. 21, 2018. 9 pages.
International Preliminary Report on Patentability received for PCT Application PCT/GB2016/053821, dated Jun. 21, 2018. 12 pages.
International Preliminary Report on Patentability received for PCT Application PCT/GB2016/053820, dated Jun. 21, 2018. 13 pages.
Extended European Search Report received for EP Application No. 15275253.1 dated May 24, 2016. 13 pages.
GB Search Report under Section 17(5) received for GB Application No: 1521648.4 dated Jun. 14, 2016. 4 pages.
International Search Report and Written Opinion Received for PCT Application PCT/GB2016/053821, dated Feb. 21, 2017. 15 pages.
GB Combined Search and Examination Report under Sections 17 and 18(3) received for GB Application No. 1620626.0 dated Mar. 30, 2017. 8 pages.
Kameya, et al., "Development of a Combined PSP/TSP Sensor Using Quantum Dot," 15th International Symposium on Flow Visualization, Jun. 25-28, 2012. 5 pages.
Stich, et al., "Multiple fluorescent chemical sensing and imaging," Chemical Society Reviews, 2010, vol. 39, pp. 3102-3114.
Extended European Search Report received for EP Application No: 15275257.2 dated Jun. 24, 2016. 7 pages.
GB Search Report under Section 17(5) received for GB Application No: 1521695.5 dated Jun. 20, 2016. 4 pages.
International Search Report and Written Opinion Received for PCT Application PCT/GB2016/053823, dated Feb. 23, 2017. 13 pages.
GB Combined Search and Examination Report under Sections 17 and 18(3) received for GB Application No. 1620632.8 dated Mar. 30, 2017. 8 pages.
Extended European Search Report received for EP Application No: 15275256.4 dated May 24, 2016. 15 pages.
GB Search Report under Section 17(5) received for GB Application No: 1521693.0 dated Sep. 22, 2016. 4 pages.
GB Combined Search and Examination Report under Sections 17 and 18(3) received for GB Application No. 1620631.0 dated Mar. 30, 2017. 9 pages.
International Search Report and Written Opinion Received for PCT Application PCT/GB2016/053820, dated Feb. 17, 2017. 19 pages.
Burmistrov, et al., "Spherical Retroreflector with an Extremely Small Target Error: International Experiment in Space," Proceedings of 13th International Workshop on Laser Ranging. 2002. pp. 1-6.
Kucharski, et al., "Spin parameters of nanosatellite BLITS determined from Graz 2 kHz SLR data," Elsevier, Advances in Space Research, vol. 48 (2011). pp. 343-348.
Extended European Search Report received for GB Application No. 15275258.0 dated May 23, 2016. 7 pages.
GB Search Report under Section 17(5) received for GB Application No. 1521702.9 dated May 19, 2016. 4 pages.
International Search Report and Written Opinion Received for PCT Application PCT/GB2016/053822, dated Feb. 13, 2017. 13 pages.

* cited by examiner

REMOTE SENSING

FIELD OF THE INVENTION

The invention relates to remote sensing systems and methods. In particular, though not exclusively, the invention relates to free-space optical methods of remote sensing.

BACKGROUND

Conventional free-space optical remote sensing techniques rely on irradiating a monitored environment with light intended to interact with that environment in a manner which produces a detectable change. In particular, by analysing the light that has been backscattered by target molecules within the monitored environment, such as water molecules, information about the state of those molecules may be gleaned. By inference, one may deduce the state of the environment of which those molecules form a part. For example, spectral shifts in the optical frequency of return optical signals resulting from inelastic optical interactions with a target molecule may be detected. These shifts can be either to a lower frequency (Stokes) or to a higher frequency (Anti-Stokes). By using a pulsed laser source, range data can also be simultaneously extracted.

There are two main molecular interactions of interest within such remote sensing techniques; those involving energy exchanges with phonons (density waves) known as Brillouin scattering, and those involving energy exchanges with molecular vibrational states, known as Raman scattering. Both processes have a dependence on temperature, as well as other physical parameters. The energy exchanges associated with Raman scattering are usually much larger (×1000) than those associated with Brillouin scattering, and hence the frequency shifts are concomitantly greater. This makes the Raman technique more difficult to utilise in environments where transmission windows are restricted (e.g. underwater). Consequently, Raman techniques are limited in their use. Remote sensing techniques such as Brillouin and Raman lidar methods tend to be limited by the very low levels of molecular backscatter they produce in a monitored environment, in use. Other remote sensing techniques may be used in fields such as atmospheric research. An example is the detection of certain atmospheric pollutants, whereby a remote light source is directed to a light detector separated from the light source by a sufficiently large distance (e.g. up to a kilometre or more) containing the body of atmosphere under study. By measuring the spectrum of light received at the detector from the remote light source, and the intensity of light within specified spectral ranges, spectral absorption estimates may be made which allow identification of pollutants. However, this method depends upon to ability to place a physically steady and controllable light source in a desired location and, clearly, this may not be possible or desirable in some circumstances, especially in marine environments.

The invention aims to provide an improved technique for remote sensing.

BRIEF DESCRIPTION

At its most general, the invention provides a system and method for remote sensing using retro-reflective optical elements placed in an environment to be monitored. These are illuminated by a remote light source such that retro-reflected light may be detected for subsequent analysis as desired to monitor/detect properties of the remote environment. The invention provides a retro-reflective optical element(s) possessing a focuser part and a separate reflector part connected to it across an open spacing. The result enables efficient convergence (by the focuser part) of incoming light towards the reflector part. This greatly enhances the efficiency of retro-reflection of incident light and in preferred embodiments may also enhance capability if/when the optical element(s) bears a photo-luminescent material having a photo-luminescent response that is dependent upon a physical property of the monitored environment. The photo-luminescent response may be variable according to changes in a physical property of the monitored environment.

In a first of its aspects, the present invention may provide system for remotely sensing light emanating from within a monitored environment, the system comprising one or more retro-reflective optical elements bearing an optically reflective optical coating upon a surface thereof and positionable within the environment to be monitored. The system includes a light source arranged to direct a beam of light at the optical element(s), and a detector arranged to receive from the optical element(s) light returned by the optical coating (e.g. retro-reflected) in response to the beam of light and to detect a property of the monitored environment according to said returned light (e.g. retro-reflected) response. A said optical element includes a body comprising a focuser part of positive optical power partly surrounded by a reflector part separated therefrom and connected thereto across an open spacing. The optical coating is arranged over an outer surface of the reflector part thereat to receive light which has been at least partially converged by the focuser part for subsequent retro-reflection.

The separated positioning of the reflector part relative to the focuser part enables the use of focuser parts which have insufficient optical power to bring incident collimated light to focus at their inner surfaces. Such a high optical power and internal focusing ability would be desirable to enhance retro-reflective efficiency, but comes at the cost of requiring optically dense materials for manufacture of the focuser part that are expensive and of limited availability. According to the invention, the focuser part may comprise optical material that is of lower refractive index and defines a focal plane, surface or locus outside of the body of the focuser, and which is less dense, less expensive and more readily available. The reflector may be placed at or near the focal plane, surface or locus of the focuser thereby to enhance retro-reflective efficiency without requiring the use of high-index materials.

Desirably, the invention may provide a retro-reflective optical element(s) bearing a photo-luminescent material, and provide a source of excitation light for irradiating the photo-luminescent material remotely when the optical element is placed within a monitored environment. The retro-reflective action of the optical element permits efficient return of photo-luminescent light generated by the photo-luminescent material in response to the excitation light. The photo-luminescent response of the photo-luminescent material is preferably variable according to changes in a property of the photo-luminescent material inducible by changes in the monitored property of the monitored environment.

For example, a changeable property of the photo-luminescent material may be the spectral wavelength of light at which a peak in photo-luminescent light emission intensity occurs. The photo-luminescent material may comprise a Quantum Dot (QD) material. The monitored property may be the temperature of the monitored environment. Another example is the relative emission intensity of the photo-luminescent material relative to a reference photo-luminescent intensity (e.g. of the same material). The photo-luminescent material may comprise a platinum meso-tetra (pentafluorophenyl)porphine (PtTFPP). The monitored property may be temperature and/or pressure. The monitored property may be salinity (e.g. of water) and the photo-luminescent material may comprise a luminophore having a photo-luminescence which is quenchable in response to the presence of salinity (e.g. Cl⁻ ions). Examples include:

Lucigenin; or, 6-methoxy-N-(3-sulfopropyl)quinolinium; or,

N-(ethoxycarbonylmethyl)-6-methoxyquinolinium bromide; or, 6-methoxy-N-ethylquinolinium iodide.

In this way, a photo-luminescent property of the photo-luminescent material may be responsive to a physical property (e.g. temperature, pressure, salinity etc.) of the monitored environment as a result of interaction with it. Remote excitation of the photo-luminescent material, by a light source, enables the photo-luminescent property to be detected via photo-luminescent light returned with the aid of the retro-reflective action of the optical element(s). Therefrom, the physical property of the monitored environment may be measured.

Preferably the optical element(s) bears a photo-luminescent material over a surface of the reflector part and/or the focuser part, and the detector is arranged to receive from the optical element(s) photo-luminescent light generated by the photo-luminescent material in response to the beam of light. Preferably, the photo-luminescent material is arranged such that said photo-luminescent response is variable according to changes in a property of the photo-luminescent material (e.g. its temperature, the pressure it experiences, and/or degree of photo-luminescence quenching) inducible by changes in said property of the monitored environment.

The photo-luminescent material is preferably located on the reflector part between the focuser part and the optical coating of the reflector part.

The photo-luminescent material may be exposed and directly accessible by said environment. This may be desirable when the property of the environment (e.g. water) being monitored is its salinity, thereby allowing direct contact between the photo-luminescent material and the water. Other environmental properties may be monitored by such direct contact, such as pressure, temperature or other properties.

The photo-luminescent material may be coated by an anti-reflective optical coating. This may be desirable if the photo-luminescent material is not required to directly contact the monitored environment (e.g. pressure or temperature monitoring) such that the anti-reflective optical coating does not impede that monitoring.

The focuser part may be coated by an anti-reflective optical coating. This may enhance the through-put of light through the focuser part.

The photo-luminescent material may preferably be responsive to the beam of light to generate photo-luminescent light comprising light of an optical wavelength differing from the optical wavelength(s) of light comprising the beam of light.

The optical element(s) may bear two different photo-luminescent materials: a first material responsive to changes in a specified physical property in the monitored environment, as discussed above; and a second material which may be insensitive to such changes and may thereby serve as a source of reference photo-luminescent light with which to calibrate the photo-luminescent light detected from the first material. Alternatively, or in addition, the optical element(s) may bear a second (or further) photo-luminescent material which is responsive to changes in a specified physical property of the monitored environment different to that which the first material is responsive to, and may preferably be insensitive to the specified physical property of the monitored environment to which the first material is responsive. This allows two or more different properties to be measured contemporaneously and independently.

The photo-luminescent material may comprise a Quantum Dot material, and the property of the monitored environment may include temperature. The photo-luminescent material may comprise a platinum meso-tetra(pentafluorophenyl)porphine (PtTFPP), and the property of the monitored environment may include pressure and/or temperature.

The photo-luminescent material may comprise both a Quantum Dot material and a platinum meso-tetra(pentafluorophenyl)porphine (PtTFPP) combined and the properties of the monitored environment may be both temperature and pressure.

The photo-luminescent material may comprise Lucigenin, and the property of the monitored environment may include salinity.

An aforesaid optional second photo-luminescent material, when serving as a source of reference photo-luminescent light, may comprise a photo-luminescent dye (or other known photo-luminescent material with the required insensitivity) such as would be readily available to the skilled person. Preferably, when multiple photo-luminescent materials are present on an optical element, each is arranged to emit photo-luminescent light at a distinct wavelength differing from that at which the other photo-luminescent material(s) present will emit.

The detector may be arranged to determine a value of the optical wavelength at which a peak in said photo-luminescent response occurs, to calculate a value representing a temperature of the monitored environment according to said optical wavelength value, and to output the result.

Alternatively, or additionally, the detector may be arranged to determine a value of the intensity (e.g. a relative intensity) of said photo-luminescent response, to calculate a value representing a temperature and/or a pressure of the monitored environment according to said intensity value, and to output the result.

Alternatively, or additionally, the detector may arranged to determine a value of the intensity (e.g. a relative intensity) of said photo-luminescent response, to calculate a value representing a salinity of the monitored environment according to said intensity value, and to output the result.

The detector may be arranged to determine a value of the intensity of photo-luminescent light from a said reference photo-luminescent material, and to calibrate an intensity value associated with a contemporaneously-received photo-luminescent signal from a photo-luminescent material (sensing layer) accordingly. Such calibration may be by dividing the latter by the former. The detector may be arranged to determine the value of a relative intensity of photo-luminescent light from the photo-luminescent material, this being relative to the photo-luminescence intensity of a reference luminophore. The detector may be arranged to implement a technique of Dual Luminophore Referencing (DLR) accordingly in which such relative intensity is directly measured without the need to separately measure the photo-luminescent responses for the reference material. If a technique of DLR is employed, then reference photo-luminescent material preferably has a luminescence decay time ($\tau_{ref}$) which is greater than the luminescence decay time ($\tau_{ind}$) of the environment-sensing 'indicator' photo-luminescent material by a factor of at least 100, or more preferably by a factor of at least 250, yet more preferably by a factor of at least 500, or even more preferably by a factor of at least 1000.

The reference photo-luminescent material, and the indicator photo-luminescent material may be excitable by excitation light of the same wavelength. This permits one light source to excite both. The materials may be selected to photo-luminescent by emitting wavelengths of light that overlap, or that differ, as desired. In the latter case, this allows the photo-luminescent emission signals of each to be separately identified. The reference photo-luminescent material may have a decay time ($\tau_{ref}$) having a value of between 1 μs and 100 μs. The indicator photo-luminescent material may have a decay time ($\tau_{ind}$) having a value of between 1 ns and 100 ns. Preferably, the photo-luminescent emission of the reference photo-luminescent material is substantially (practically) constant during a period of time corresponding to the decay time of the indicator photo-luminescent material. The light source may be arranged to output and excitation light having an intensity modulated to vary periodically with a modulation period (T=2π/ω) that exceeds the decay time of the indicator photo-luminescent material by a factor of at least 100, or more preferably of at least 1000, yet more preferably of at least 10,000 (e.g. $\omega\tau_{ind}$<0.01, or 0.001, or 0.0001). The frequency (ω=2π/T) of the modulation is preferably a value between 1 kHz and 100 kHz, such as between 25 kHz and 75 kHz, e.g. about 40 kHz to 50 kHz, or a value therebetween such as 45 kHz.

This use of a relative intensity value allows account to be taken of changes in the value of the intensity of the photo-luminescent response of the sensing layer which are not due to physical changes in the monitored environment but are instead due to changes in other factors, such as the distance (from the detector) to the optical element and/or changes in optical attenuation of light passing between the detector and the optical element (e.g. absorption, scattering of light etc.).

In this way, a received photo-luminescent response may be calibrated or normalised to provide a 'relative' intensity value—i.e. relative to the photo-luminescent intensity of the reference photo-luminescent material upon the same optical element.

Alternatively, or additionally, the detector may be arranged to determine a value of the intensity of the purely retro-reflected light from the light beam with which the optical element was initially illuminated, by the light source. The detector may be arranged to calibrate the value of the intensity of photo-luminescent light according to the value of the intensity of the retro-reflected light from the light beam. This may be done by dividing the former value by the later value to produce a 'relative' photo-luminescent intensity value.

In a second aspect, the invention may provide a method for remotely sensing light emanating from within a monitored environment to detect a property of the monitored environment, the method comprising, providing one or more retro-reflective optical elements bearing an optically reflective optical coating upon a surface thereof and positioning said optical elements within the environment to be monitored, directing a beam of light at the optical element(s), at a detector, receiving from the optical element(s) light returned by the optical coating (e.g. retro-reflected) in response to the beam of light and, detecting a property of the monitored environment according to said returned light response (e.g. retro-reflected). A said optical element, used in the method, includes a body comprising a focuser part of positive optical power partly surrounded by a reflector part separated therefrom and connected thereto across an open spacing, and wherein the optical coating is arranged over an outer surface of the reflector part thereat to receive light which has been at least partially converged by the focuser part for subsequent retro-reflection.

The optical element(s) preferably bears a photo-luminescent material over a surface of the reflector part and/or the focuser part; and at the detector receiving from the optical element(s) photo-luminescent light generated by the photo-luminescent material in response to the beam of light, wherein the photo-luminescent material is arranged such that said photo-luminescent response is variable according to changes in a property of the photo-luminescent material inducible by changes in said property of the monitored environment.

There now follow some examples of the many and various embodiments of the invention. These described embodiments are useful for a better understanding of the invention, but which are not intended to be limiting.

DETAILED DESCRIPTION

Figure 1:
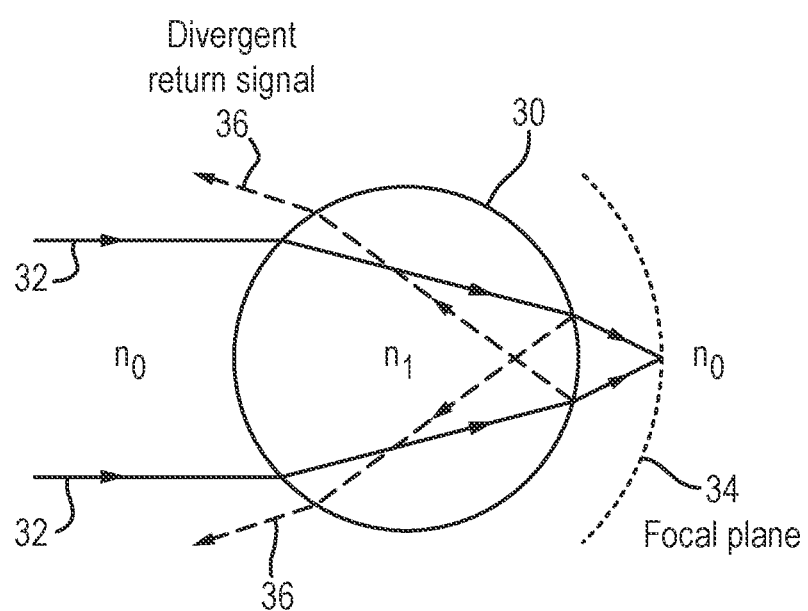
FIG. 1 schematically shows a non-optimal retro-reflective glass bead.

In the drawings, like items are assigned like reference symbols.

FIG. 1 schematically illustrates an optical glass bead 30 formed from a sphere of glass having refractive index $n_1$ immersed within an environment having a refractive index $n_0$ and illuminated with a beam of visible light 32 which enters the body of the spherical bead at one side and exits the body of the bead at the opposite side. The positive optical power of the glass bead means that light passing through it is converged towards the surface of the bead at its exit side. However, complete convergence is not achieved at the surface of the exit side due to insufficient refractive power of the glass at the surface of the entry side of the glass bead at the interface between the glass of refractive index $n_1$ and the environment of refractive index $n_0$. The result is that the focal plane 34 of the glass bead lies outside the bead.

A further consequence of the insufficient refractive power of the glass is that internal reflections of light which occur at the internal surface of the exit side of the glass bead, at the interface between the glass of refractive index $n_1$ and the external environment of refractive index $n_0$, produce a retro-reflected return signal 36 which is divergent. Had the position of the focal plane of the glass bead been coincident with the internal surface of the exit side of the glass bead, then the retro-reflected signal would have been substantially collimated and parallel to the incident light beam 32, thereby optimising retro-reflection efficiency.

It can be shown that retro-reflection is optimised when $(n_1/n_0)=2$. When $(n_1/n_0)<2$, light is focussed outside the bead, as shown in FIG. 1. When an external environment has a refractive index significantly greater than 1.0 (e.g. water), then it becomes necessary to use glass beads of ever higher refractive index (e.g. $n_1=2.67$, when used in water) and these high values become commercially impractical to use due to the cost and availability of such glasses. Furthermore, a high refractive index glass is typically of concurrently higher density and therefore likely to sink in water rapidly. This would be highly undesirable when monitoring open water (e.g. ocean) environments over extended periods.

Figure 2:
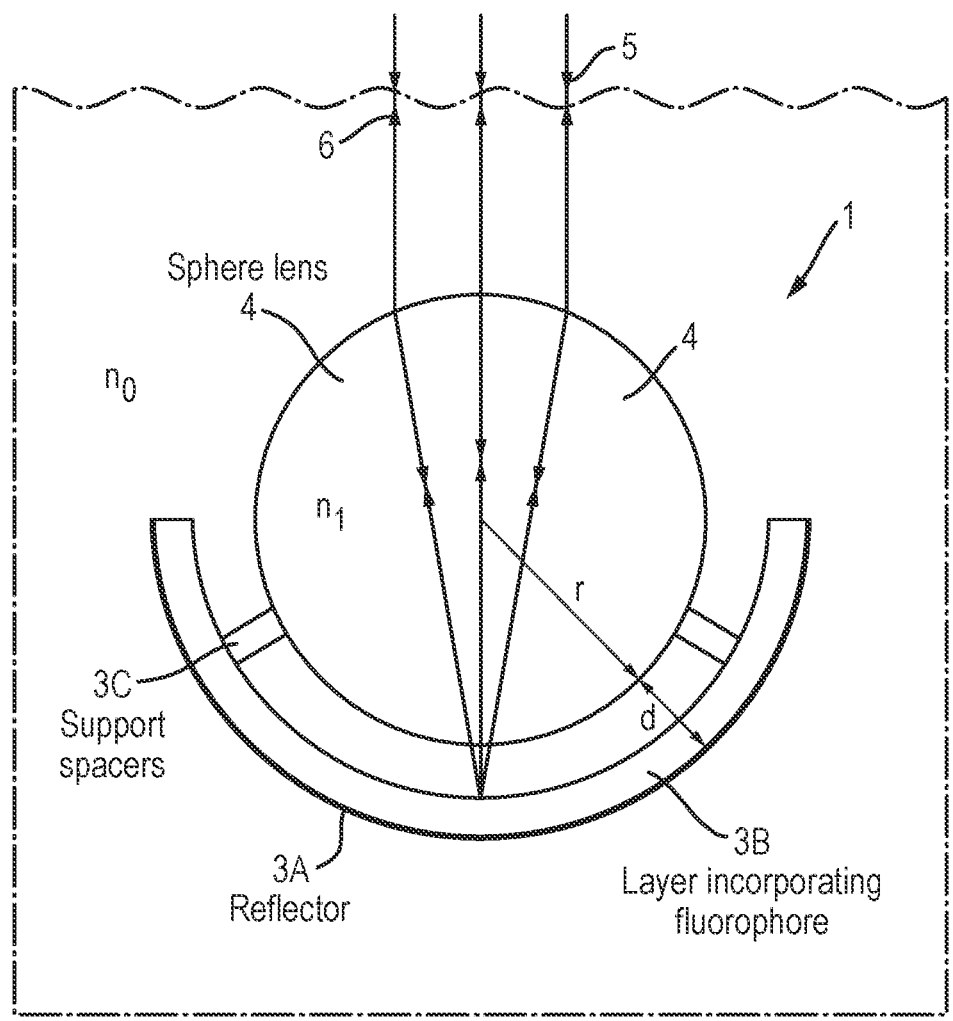
FIG. 2 schematically shows a retro-reflective glass bead according to an embodiment of the invention.

FIG. 2 schematically illustrates a cross-sectional view of a preferred embodiment of the invention comprising an optical element 1 positionable within an environment (e.g. water) to be sensed remotely using light. The optical element(s) includes a body comprising a focusing part 4 of positive optical power and a reflector part (3A, 3B, 3C) comprising an optically reflective hemispherical surface 3A. The focuser part is a mm-sized optically transparent solid sphere 4 (glass or plastic may be used). Other shapes may be used for the focuser part (e.g. see FIG. 7). The refractive index of the focuser part may be about n=2 most preferably if the bead is to be used in water (e.g. marine environments), and may be n<2 if used in air (e.g. atmospheric use or use on land/non-marine). This optimises or improves the convergence of incident light at the reflector part.

The focuser part is partly surrounded (i.e. some of it, but not all of it) by the reflector part which is separated from, and connected to, the focuser part by an open spacing. A pair or support spacer posts 3C of the reflector part connect the reflector part to the focuser part and the common length of these support spacer posts defines a spacing of substantially uniform width between the reflector part and the focuser part. The width is selected such that the reflective surface 3A of the reflector part substantially coincides with (or is just after) the location of the hemispherical locus of focal points (i.e. the focal 'plane') of the focuser part 4. The reflective surface of the reflector part defines a substantially hemispherical shell or dish having a radius of curvature (r+d) substantially centred upon the origin of the centre of the radius of curvature (r) of the spherical focuser part. As a result, one whole hemisphere of the focuser part is surrounded by the reflector part, as it sits within the bowl of the reflector part, uniformly spaced from its inner face by the aforementioned open spacing (note that FIG. 2 shows a cross-sectional view for clarity). Multiple support spacer posts may be used, optionally more than the two shown in FIG. 2. The non-surrounded hemisphere of the focuser (upper hemisphere in FIG. 2) is wholly exposed to the monitored environment and is not covered by the reflector part.

As a consequence of this arrangement, incident light 5 from a light source (e.g. item 21, FIG. 3) is collected by the focuser part 4 and converged towards the reflective surface 3A of the reflector part for efficient retro-reflection back towards the light source for detection thereat, as discussed in more detail below. Immediately after retro-reflection by the reflector part, the reflected light 6 is passed through the focuser part in the return direction and is substantially collimated as a result. This further enhances the strength of the return optical signal 6.

In preferred embodiments, optionally, a photo-luminescent fluorophore material 3B of substantially uniform thickness is arranged (e.g. coated) on the inner surface of the reflective surface 3A of the reflector part. As such, the fluorophore material may define the exposed interior surface of the hemispherical bowl of the reflector part, facing in direct opposition to the focuser part 4. This is shown in FIG. 2, but may be omitted in other embodiments, thereby leaving the reflective surface 3A of the reflector part exposed to the focuser part. Optionally, the coating of fluorophore material may itself bear an outer coating of an anti-reflective (AR) optical material to enhance its optical performance, but such an AR coating may be absent in other embodiments where it is desirable to have direct exposure of the fluorophore to the monitored environment. Preferably, the focuser part is coated with an AR optical coating (not shown) to enhance its performance. In other embodiments, optionally in addition or as an alternative, the outermost surface parts of the focuser part opposing the reflector part (or substantially its entire surface) may bear a coating of a photo-luminescent material. In such a case, if the focuser part also bears an AR optical coating, then that AR coating preferably over-coats the photo-luminescent layer 3B.

This coating of photo-luminescent material, whether on the reflector part or the focuser part (or both) is referred to herein as the "sensing layer", and is partially transmissive at optical wavelengths of light thereby to allow incident optical radiation 5 to pass through it and to allow photo-luminescent light 6 from the sensing layer to exit the optical element.

The diameter of the optical element is preferably between about 1 mm and about 10 mm, and preferably between about 2.5 mm and about 7.5 mm, more preferably between about 4 mm and about 7 mm, such as about 5 mm or 6 mm. This diameter range preference applies not only to the hemispherical reflector shell, or spherical focuser bead described in the present embodiment, but also to embodiments (not shown) in which the optical element is more generally spheroidal and the 'diameter' refers to the larger axis thereof.

The photo-luminescent layer 3B preferably has an absorption coefficient (A) of about 0.5, though other values may be employed in the range of about 0.25 to about 0.75, or preferably about 0.35 to about 0.65, or more preferably about 0.45 to about 0.55. As discussed above, over-coating this photo-luminescent layer is arranged upon a reflective optical surface 3A arranged to retro-reflect incident light 5 emanating from a light source (22, FIG. 3), and simultaneously reflect/direct photo-luminescent light 6 from the sensing layer out from the optical element in substantially the direction to the incident light and back towards the light source. In embodiments that omit the sensing layer, the returned light signal 6 corresponds to reflected light from the incoming beam of light 5 reflected by the reflective optical surface 3A.

The reflective surface 3A is preferably substantially wholly reflective at optical wavelengths of light, and extends over substantially the entire convex surface the coating of photo-luminescent material. This permits incident optical radiation 5 to pass through the focuser part 4 via its non-surrounded hemisphere, and to allow photo-luminescent light 6 from the sensing layer to exit the optical element through the non-surrounded hemisphere of the focuser part.

The density of the reflector part and the density of the focuser part is preferably such that the overall density of the optical element is less than 1 g/cc. The density of the reflector part may be less than 1 g/cc and the density of the focuser part may be greater than 1 g/cc, or vice versa, subject to this constraint. Preferably, the overall density of the optical element is less than the density of water, and is therefore buoyant in water. Alternatively, the optical element may have neutral density in water, or may have a slow terminal velocity in water and falls slowly.

The support spacer posts 6 may be plastic, and the focuser part may be plastic, crystalline or glass. Preferably the ratio (d/r) of the separation (d) of the reflective surface 3A and the radius (r) of the focuser part is as small as possible while achieving the desired effect. This is so as to maximise the optical cross-section of the focuser part to maximise the retro-reflected return signal.

By locating the sensing layer 3B between the surface of the focusing part 4 (e.g. a sphere) and the reflective optical surface 3A, as shown in FIG. 2, a spectrally modified optical return signal 6 is generated by the photo-luminescent coating, with efficient retro-reflection. The photo-luminescent optical output 6 of the sensing layer, generated in response to absorption of the incident optical radiation 5 from the remote light source (22, FIG. 3), is spectrally distinct from the incident radiation and can be remotely detected as such. The sensing layer is preferably thin compared with the radius of the focusing part in order to enhance the retro-reflective properties of the optical element. The sensing layer may preferably have a thickness substantially matching a few wavelengths ($\lambda_i$) of the incident light from the light source. The thickness may be between about 10 µm and 100 µm thick, or preferably between about 40 µm and 50 µm thick. Preferably, the sensing layer is substantially uniformly thick across the surface it coats.

Consider, in general terms, a surface reflectivity of an optical body "R" that produces a return signal, "S". In purely retro-reflection terms, S is given by:

S=(fraction of incident light transmitted by first surface)×(reflectivity of back surface)×(fraction of light transmitted by first surface on return pass)

i.e. $S = (1 - R_1) \cdot R_1 \cdot (1 - R_1)$    Eq.(1)

where $R_1$ is the surface reflectivity $S = R_1 - 2R_1^2 + R_1^3$

Differentiating with respect to $R_1$ gives:

$$\frac{dS}{dR_1} = 1 - 4R_1 + 3R_1^2$$

Thus, S is maximised when $R_1 = 0.333$. This gives $S_{max} = \sim 15\%$. This illustrates the role of surface reflectivity in generating a return signal from a retro-reflective body. If the sensing layer 3B is included, as is the case in preferred embodiments, then the sensing layer converts a fraction A of the incident light 6 of wavelength $\lambda_i$ into a photo-luminescent optical signal 6 of shifted wavelength, $\lambda_s$.

Returning to the general analysis, Eq.(1) becomes modified to:

$S_s = (1 - R_1)^2 \cdot R_1 \cdot A$    Eq.(2)

Here, $S_s$ is wavelength-shifted photo-luminescent optical signal 6. Since $R_1$ and A are independent variables, $S_s$ is maximised when A=0.5 and as before $R_1=0.3$ giving a signal of ~3.7%. This generalised analysis shows the influence of a sensing layer in a return signal. In preferred embodiments, this is further enhanced by the use of a wavelength selective optical coating over the photo-luminescent material and/or over the non-surrounded hemispherical surface of the focuser part 4. This optical coating may be optimised to be anti-reflective to incident light 5 at the exciting wavelength ($R_1=0$), but possess a finite reflectivity for photo-luminescent light 6 at the shifted wavelength ($R_s$).

Hence equation (2) becomes:

$$S_S = (1 - R_i)(1 - A) \cdot R_S \cdot (1 - R_S) \cdot A \qquad \text{Eq. (3)}$$
$$= (1 - A) \cdot A \cdot (1 - R_S) \cdot R_S$$

This is maximised when both A and $R_s=0.5$, giving $S_s=0.5^4$ or 6.3%. The values of A and $R_s$ may be adjusted by design methods readily available to the skilled person, such as by using multi-layered optical coatings (to control $R_s$) and by controlling the photo-luminescent layer thickness or the concentration of photo-luminescent material (e.g. dye) within it.

In embodiments in which the non-surrounded surface area of the focuser part is coated with an anti-reflecting optical coating (not shown), that coating is preferably highly, or substantially fully anti-reflective at optical wavelengths of light including both the incident light of the light source and the photo-luminescent light signal. In this way, both the excitation light from the incoming light beam, and the photo-luminescent light generated by the sensing layer, are able to efficiently transmit through the surface of the focusing part with minimal (or at least less) loss due to reflection.

Figure 3:
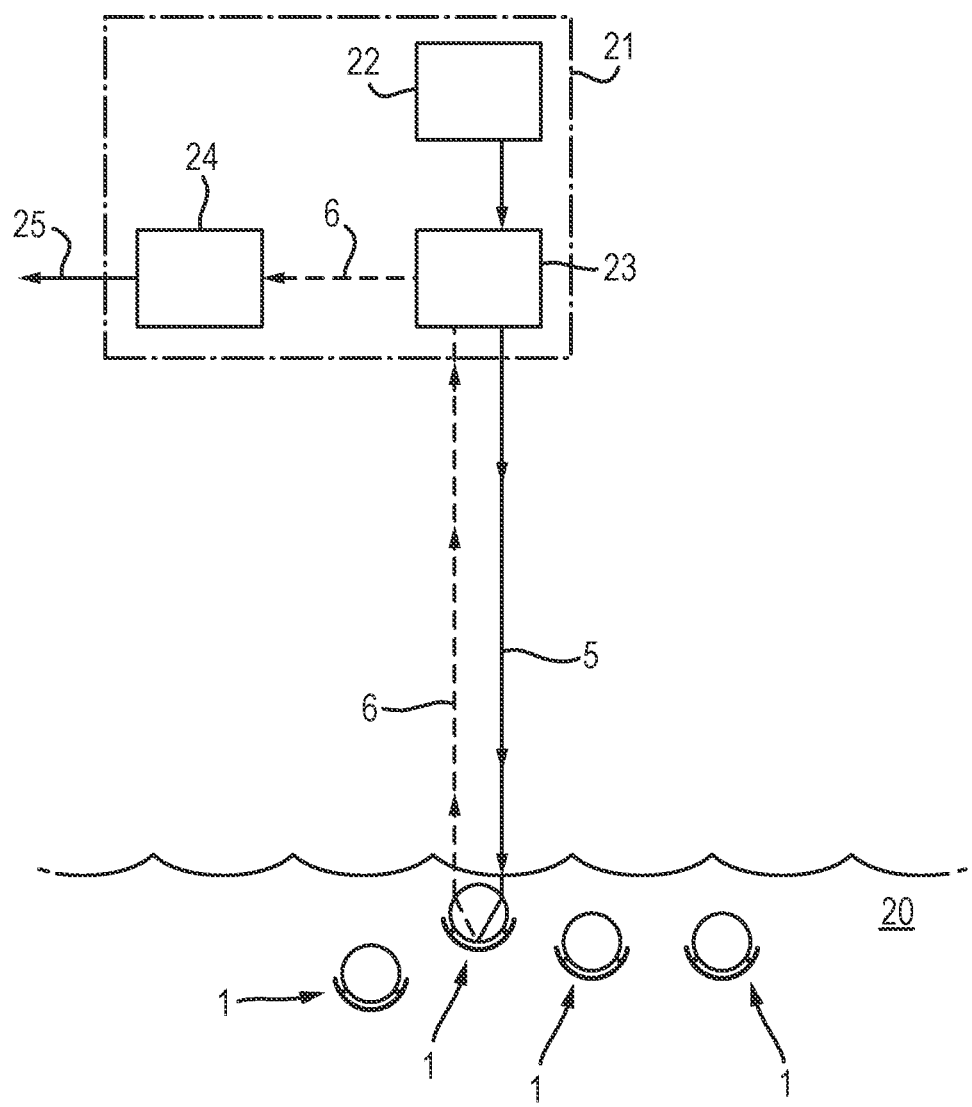
FIG. 3 schematically shows a system according to an embodiment of the invention, comprising light source and detector and retro-reflective glass beads according to FIG. 2 or 7.

Consequently, the sensing layer may serve the function purely of being a generator of photo-luminescent light and need not be constrained by requirements of being suitably transmissive to incoming light from the light source (22. FIG. 3). Furthermore, the reflective surface 3A at the back/outer surface of the sensing layer is a highly (e.g. substantially totally) reflecting optical surface for reflecting/directing towards the focuser part any photo-luminescent light generated by the sensing layer. The reflectivity of the reflective surface 3A may preferably be highly reflective at optical wavelengths including both the excitation light 5 and the photo-luminescent light 6 generated by the sensing layer. In this way, if any quantity or portion of the exciting light initially passes through the sensing layer unabsorbed by it, then the reflective surface 3A may reflect that portion of light back into the sensing layer to be absorbed thereby to excite photo-luminescence. This enhances the efficiency of conversion of excitation light 5 into photo-luminescent light 6. In principle, such a device may provide signal efficiency at the shifted wavelength of the photo-luminescent light.

This embodiment may be most useful when the optical element 1 is positioned within the environment to be sensed in such a way that the some or all of the non-surrounded hemisphere of the focuser part 4 are more likely than not to be facing in the direction of the light source 22 so as to receive incoming excitation light 5. This may be most suitable when the optical element is substantially static within the environment in question. Alternatively, a large number of non-static such optical elements may be employed collectively to monitor a dynamic environment (e.g. a fluid) in which the optical elements move freely. In that case, one may find that, amongst the optical elements collectively, at a given time, on average, the proportion of surrounded hemisphere presented towards a light source 22 (which obscures the sensing layer from the light source) substantially matches the proportion of non-surrounded hemisphere presented towards a light source (which openly presents the sensing layer to the light source), when counted across all of the elements at one time.

For in-water use, in which the optical elements are within water, the focuser part (e.g. spheres) may be made from a material with a refractive index of about 2.0, For example, S-LAH79 glass (n=2.00) may be used. This ensures that the incident light from the light source (e.g. laser) is tightly focussed onto the back surface of the reflector part of the optical element, maximising retro-reflectivity. The wavelength of incident light may be preferably not greater than about 500 nm (e.g. blue/green excitation light) and the photo-luminescent layer may be arranged to produce luminescent light of about 550 nm wavelength (e.g. yellow/green luminescent light). A broadband reflective surface 3A on the reflector part may be a metallic layer. For pressure sensing, the reflective surface 3A may preferably be thin enough to relay the external force being applied. The simplest form of AR coating for the focuser part may be a layer of material whose refractive index, $n_2$, is the geometric mean of the adjacent media, i.e., $$n_2 = \sqrt{n_0 \cdot n_1}$$

For a water/S-LAH79 interface:

$$n_2 = 1.64$$

A close match would be a layer of lanthanum fluoride ($n_2$=1.61) at 500 nm. The reflectivity, $R_0$, of an uncoated surface is given by:

$$R_0 = \left(\frac{n_1 - n_0}{n_1 + n_0}\right)^2$$

For the above example, this gives a value for $R_0$ approaching 4%. An intermediate layer of lanthanum fluoride would result in two approximately equal reflections that in total would be half that of the uncoated surface. If such an intermediate layer was of quarter wavelength thickness, destructive interference between the two reflectors could reduce the reflection further, to nearly zero in value.

In other uses, such as in air, the refractive index of the focuser part of the optical element(s) may be lower to achieve the same effect. Suitable optical glasses and other materials (e.g. crystalline solids, plastics) maybe employed such as are readily available to the skilled person.

Sensing Layer

There exist a number of materials whose spectroscopic properties change when exposed to exterior physical parameters such as temperature and pressure. Fluorophores based on quantum dots (QDs) are synthetic materials that can be tailored to fluoresce at different desired wavelengths by changing their physical size. Smaller QDs emit photo-luminescent light of shorter wavelengths as compared to larger QDs. The optical transmission window in the blue/green region of water, such as oceans, is well matched to their absorption band.

Figure 4:
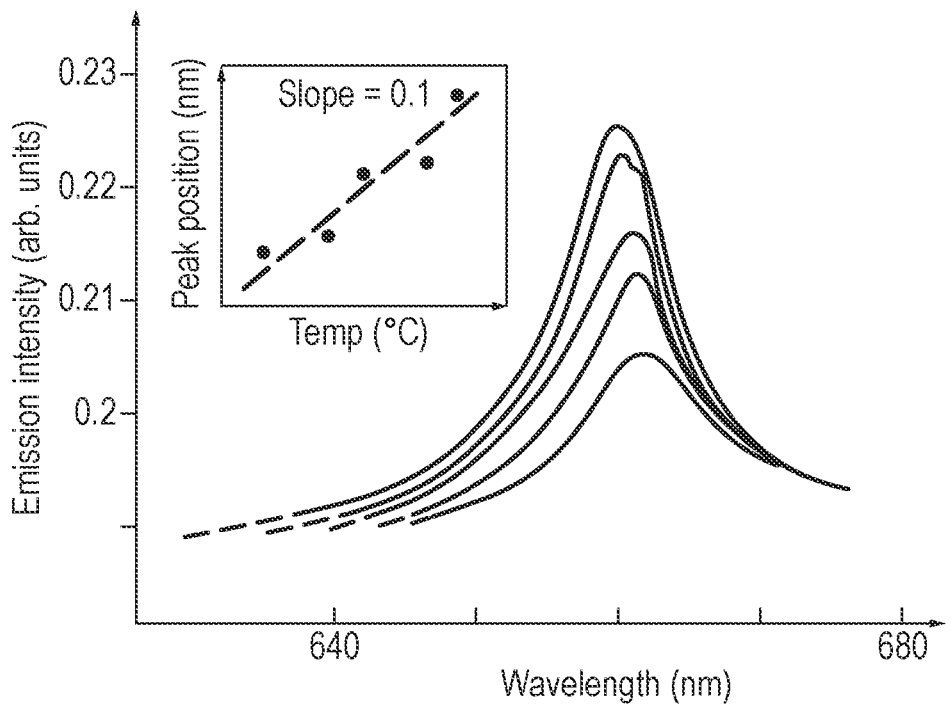
FIG. 4 graphically shows the typical spectral fluorescent response of a Quantum Dot (QD) to changes in temperature.

The peak fluorescence wavelength of QDs is dependent upon the temperature of the QD. This is a result of temperature-dependant changes in the size of the QD and, hence, its band-gap energy. FIG. 4 shows graphically the spectral emission intensity of a QD as a function of increasing temperature. The photo-luminescence (fluorescence in this case) signal of the QD at a given temperature is seen to peak sharply and distinctly at a specific optical wavelength of light. As the temperature of the QD increases then so too does the optical wavelength at which this peak in luminescence occurs. A steady and reliable linear relationship exists between the spectral peak position and QD temperature as shown by the inset in the graph of FIG. 4. It can be seen from FIG. 4 that a wavelength shift of ~0.1 nm/° C. is typically observed. There is also a large temperature dependency on the emission line-width of 0.24 nm/° C. Such changes, i.e. either spectral peak position and/or spectral line-width, may be measured using a spectrometer according to preferred embodiments of the invention (see FIG. 3) in order to determine the temperature of a sensing layer comprising QDs.

Figure 5:
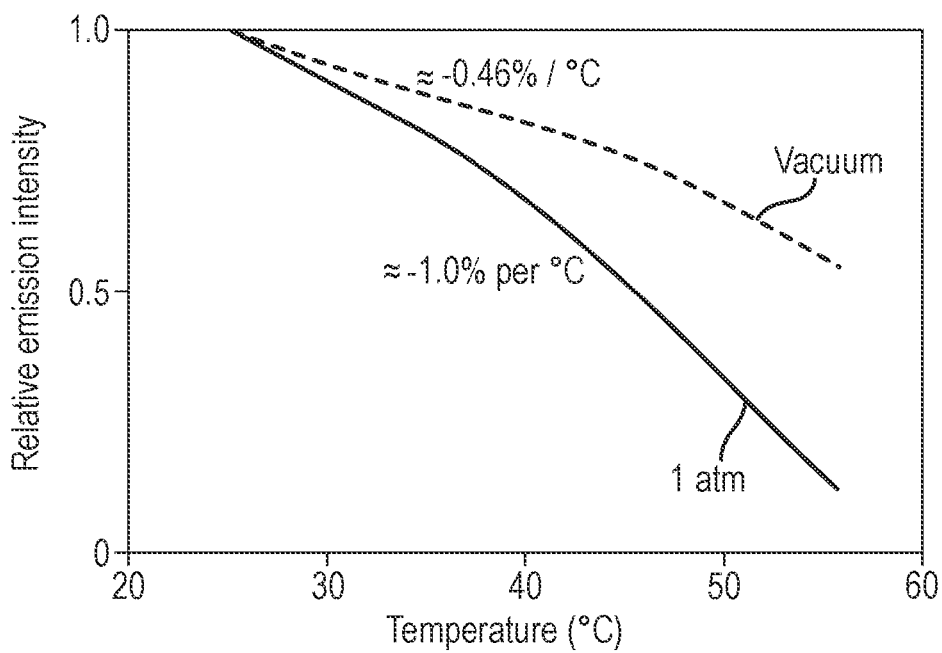
FIG. 5 graphically shows the typical fluorescent response of a PtTFPP to changes in temperature and pressure.

The fluorescent intensity output of another group of fluorphores is found to be dependent on both temperature and pressure. An example is platinum (II) mesotetra (pentafluorolphenyl) porphine or PtTFPP. FIG. 5 graphically illustrates one example of the variation in the fluorescent emission intensity of material as a function of changes in both temperature and pressure. It can be seen that at low pressure (e.g. vacuum) the material displays an emission intensity that falls in direct proportion to its temperature, whereas at a higher pressure (e.g. 1 atm), the rate of fall of the emission intensity increases. This sensitivity to both pressure and temperature may be used to remotely sense such properties according to embodiments of the invention. This material may be employed in preferred embodiments of the invention. The intensity sensitivity of PtTFPP to pressure variations may be ~0.8%/KPa at and around atmospheric pressure, and may about 1%/° C. in relation to temperature variations at and around atmospheric pressures.

Figure 6:
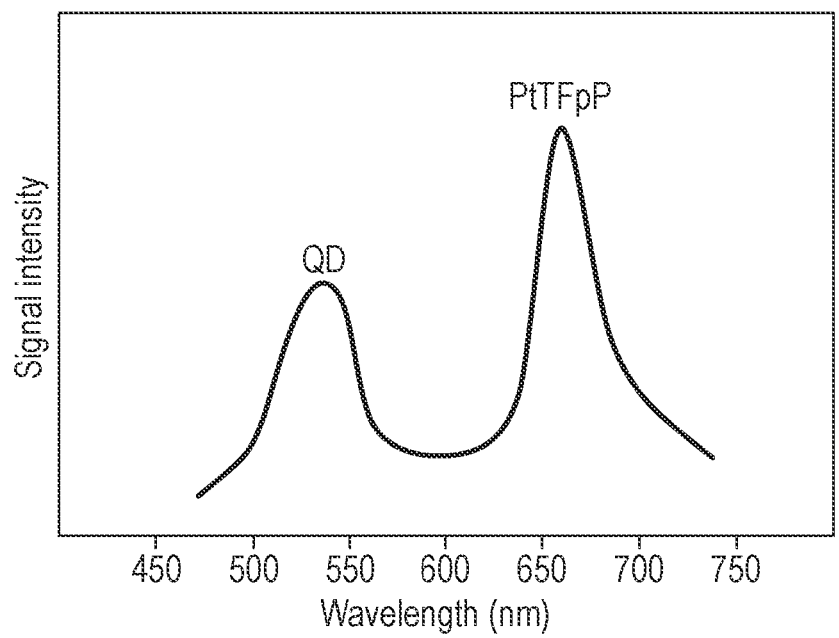
FIG. 6 graphically shows the typical fluorescent response of a sensing layer comprising a combination of quantum dots (QD) and PtTFPP.

It is found that QD sensors such as the above are generally insensitive to pressure, however a combined pressure and temperature sensor comprising a sensing layer containing a mixture of PtTFPP and QDs may be employed in preferred embodiments of the invention. These fluorophores emit at different wavelengths and so when illuminated by the same laser can be differentiated and measured. The photo-luminescent emission spectrum of FIG. 6 illustrates this.

In a further example, the sensing layer may comprise a chlorine-quenchable fluorescent probe such as Lucigenin. The embodiment illustrated in FIG. 2 is particularly suited to this application because the sensing layer is directly exposed to the environment, and is not over-coated with an AR optical layer. The open spacing (d) between the focusing part and the reflector part bearing the sensing layer 3B, permits water of the monitored environment to directly contact the sensing layer thereby to permit chlorine quenching of the fluorescent probe to take place.

It has been found that changes in the fluorescence intensity of this fluorophore occur in proportion to changes in salinity of a fluid (e.g. salt water or brackish water) within which the fluorophore is placed. Salt water, such as sea water or the like, is a concentrated solution of various salts. Salinity is usually determined by measuring the chlorine content of the water since this is an abundant constituent, as a result of the presence of salt (NaCl). Empirical relationships have been found between the salinity of water and its chlorine content, or "chlorinity". Such empirical relationships typically take the form:

$$S[\%] = a_1 + a_2 Cl^-[\%]$$

where $a_1$ and $a_2$ are constants, S[%] is salinity and Cl⁻[%] is the chlorinity, both expressed as a percentage. Salinity in open seas usually ranges in value from 3.3% to 3.7%, whereas in extreme cases (isolated waters) salinity may reach about 4% or fall as low as 0.5%. Consequently, it has been found that the chlorinity of salt water resulting from its salinity, has a quenching effect on the fluorescence intensity of Lucigenin. This follows the so-called Stern-Volmer relationship which describes the intermolecular deactivation process occurring in a fluorophore. The presence of another chemical species can accelerate the rate of decay of a fluorophore from its excited state:

$$A^* + Q \rightarrow A + Q$$

Here, A* is the excited fluorophore and A is its unexcited state. Q is the 'quenching' chemical species. The kinetics of the above process obeys the Stern-Volmer relationship:

$$\frac{F_0}{F} = 1 + k_q \tau_0 \cdot [Q]$$

Here, $F_0$ and F are the rate (intensity) of fluorescence with and without, respectively, the quenching species present. The coefficient $k_q$ is the quenching rate and $T_0$ is the lifetime of the excited state A* of the fluorophore when the quenching species is absent. [Q] is the concentration of the quenching species. In this way, an embodiment of the invention may employ a fluorophore to determine the concentration [Q] of a quenching species, such as a species directly associated with salinity.

Figure 7:
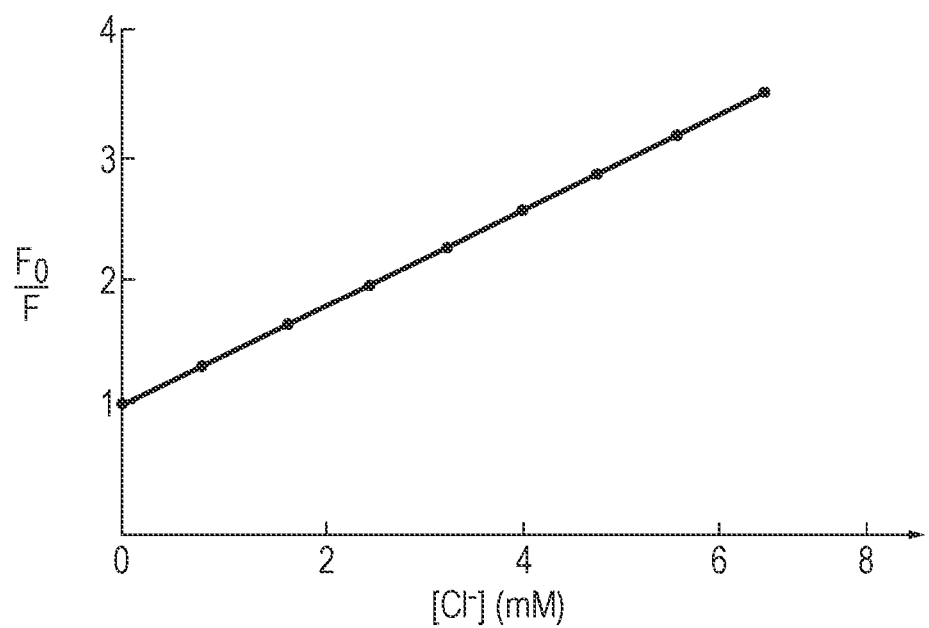
FIG. 7 schematically shows the typical quenching effect of Chlorine content (salinity) on the fluorescence intensity response (F) of Lucigenin, relative to an unquenched fluorescence intensity response ($F_0$)

Thus, the salinity of water may be measured according to this quenching effect. FIG. 7 shows a typical quenched fluorescence response (F) of Lucigenin as a function of chlorinity [Cl], graphed as the inverse of the relative fluorescence intensity ($F_0$/F) where $F_0$ is the fluorescence intensity when the chlorinity is zero, and F is the intensity when chlorinity is non-zero. Lucigenin (bis-N-methylacridinium) is a fluorophore that absorbs light up to a wavelength of 460 nm and emits with a maximum signal at 505 nm. It can be used to determine salinity as chloride ions quench the fluorescence. Both the emission intensity and lifetime fluorescence decrease in response to increased salinity. For ocean water containing on average 550 mM of chloride ions, both the fluorescence intensity and lifetime will be halved compared with pure water. In preferred embodiments, a second fluorophore, insensitive to the environment may also be incorporated into a carrier to provide a reference intensity signal.

Alternatively, the received signal can be analysed to determine the lifetime of the fluorescence using a fast (500 MHz bandwidth) detector.

In a preferred embodiment, the sensing layer may comprise not one but two different photo-luminescent materials, such as a first indicator photo-luminescent material which is sensitive to the monitored property of the environment, and a second reference photo-luminescent material which is not sensitive to the monitored property and is preferably insensitive to the properties of the environment (e.g. insensitive to temperature, pressure, salinity etc.). The indicator and reference photo-luminescent materials may be arranged to be excitable to fluoresce by the same incoming light (5) from the light source, and may be arranged to emit at the same fluorescence wavelength, or different fluorescence wavelengths as desired. The indicator and reference photo-luminescent materials may be mixed together in the sensing layer or may be arranged separately in adjacent parts of the sensing layer. Alternatively, the reference photo-luminescent material may be arranged elsewhere upon the body of the optical element (1). Most preferably, the decay lifetime of the reference photo-luminescent material is at least 100 times greater than that of the indicator photo-luminescent material so that it provides an effectively constant background photo-luminescent mission during the decay lifetime of the indicator photo-luminescent material. This arrangement of indicator and reference photo-luminescent materials renders the optical element suitable for detection by a process of Dual Luminophore Referencing (DLR), discussed in detail below.

In instances where direct contact with the water is required in order to take the measurement, such as measurement of chlorinity, the sensing layer 3B may comprise a fluorophore (e.g. Lucigenin). For example, Lucigenin may be electrostatically immobilised upon a Nafion membrane wherein the surface on which the Lucigenin is arranged is exposed as described above. This permits direct contact of Lucigenin with chloride ions, and hence provides a measurement of salinity. This has been found to fully reversibly respond to chloride ions. Nafion is a well-known material comprising a sulfonated tetrafluoroethylene based fluoropolymer-copolymer. To enhance provision of the retro-reflection function, the Lucigenin may preferably be deposited onto the inner concave surface of the hemispherical reflective shell 3A as shown in FIG. 2, but in other embodiments, it may be deposited on the surface of the focuser part which opposes the reflector part. As discussed above, since the shell is separated from the focuser part by small pillars 6 fixed to both the reflector part and the focuser part, the arrangement allows water to circulate over the Lucigenin. In preferred embodiments, the Nafion membrane bears (or contains) Ruthenium based phosphorescent molecules for use as a fluorescence reference/standard. This arrangement of indicator and reference photo-luminescent materials renders the optical element suitable for detection by a process of Dual Luminophore Referencing (DLR), discussed in detail below. An example is Ruthenium-tris(4,7-diphenyl-1,10-phenanthroline) dichloride (Ru(dpp)). This Ru(dpp) may be arranged within the Nafion membrane to shield it from interferences which may quench its fluorescence, if necessary.

It can be shown that if the focuser part is a spherical element, as shown in FIG. 2, then the focus formed by it is located at a distance, d, from the focuser given by:

$$d = \left(\frac{2n_0 - n_1}{2n_1 - 2n_0}\right) \cdot r$$

where r is the sphere's radius. Hence, for S-LAH76 spheres submerged in water, d is approximately equal to 0.5 r.

System and Apparatus

FIG. 3 schematically illustrates a system for remotely sensing light 6 emanating from within a monitored environment 20 (e.g. the open sea in this case). The system includes a plurality of retro-reflective optical elements (1) comprising a focuser part and a reflector part (e.g. preferably also photo-luminescent layer 3B) structured in accordance with a optical element as described above with reference to FIG. 2. The optical elements are positioned within the monitored environment 20 and float at or beneath the water surface of that environment. Typically, about one bead per cubic metre of volume observed (e.g. ocean water, or the atmosphere in other applications) is suitable, or one bead per metre of height/depth of the space being observed.

A monitoring unit 21 is located above the water surface of the monitored environment and comprises a laser light source 22 arranged to output a beam of light. The wavelength of this light preferably corresponds with the excitation wavelength (e.g. blue/green light) of the photo-luminescent material that coats the inner surface of the reflector part (3B) in those embodiments employing the sensing layer.

A front-end optics unit 23 is positioned to receive the light beam output by the laser light source and to pre-form the light beam so as to possess an angular divergence in the range of about one degree to a few degrees to ensure that it forms a sufficiently large a "footprint" at the optical elements thereby ensuring sufficient illumination to generate a detectable returned fluorescence signal 6 from the optical elements. Furthermore, the front-end optics unit includes elements (e.g. one or more lenses and/or mirror(s)) arranged to collect returned (e.g. optionally, fluorescent) light 6 emanating from the (e.g. optionally, fluorescing) remote optical elements (1), and to direct that collected light 6 to a detector unit 24 for analysis.

The front-end optics may be 'bi-static' and so comprise separate transmission (output) and reception (input) optical elements for handling the excitation and photo-luminescent light signals, respectively. Optical filter(s) may be used at the reception optical elements to remove light of wavelengths corresponding to excitation light, and to transmit/pass wavelengths corresponding to photo-luminescent light. In this way, the reception optical elements may be made sensitive to the photo-luminescent light which carries information, and be insensitive to excitation light which does not. This improves the sensitivity of the system.

In embodiments using the intensity of the retro-reflected component of the light beam in order to calibrate a detected fluorescent signal into a 'relative' signal (as discussed above) then such filtering may be omitted, or may be performed only after the intensity of the retro-reflected component of the beam has been measured.

In embodiments employing the sensing layer, the detector unit is arranged to detect one or more of the temperature, the pressure or the salinity of the monitored ocean environment 20 according to the properties of the returned photo-luminescent light 6 received by it. In this way, the photo-luminescent light/response produced by the photo-luminescent sensing layer is variable according to changes in a property (e.g. an optical property) of the sensing layer caused by changes in the temperature, pressure and/or salinity of the monitored ocean environment. As described above, changes in a property of the sensing layer include changes in the spectral position of, or the magnitude/size of, or a spectral width of, a photo-luminescent/fluorescence intensity or a produced by the sensing layer in response to the excitation light of the light beam 5.

For example, the detector unit 24 may comprise a set of optical filters, such as narrow-band filters, which each has a respective pass band located or centred at an optical wavelength different from that of the other optical filters of the set such that the collective pass-band locations of the filter set span the spectral location of a photo-luminescence peak of the photo-luminescent material upon the optical beads being illuminated. The detector unit may be arranged to pass received light through the optical filters and to compare the relative intensities of the respective optically filtered signals. From this comparison, the detector unit may be arranged to determine the spectral location of the photo-luminescence peak of the received light by a process of interpolation or extrapolation, using techniques such as will be readily apparent to the skilled person. As an alternative to an optical filter set, the detector unit may comprise a spectrometer (e.g. employing an optical grating) arranged to disperse received light into an optical spectrum, combined with a photo-detector array (e.g. CCD or CMOS) arranged to measure the intensity of the spectrum across a range of wavelength spanning the spectral location of the photo-luminescence peak of the received light. The detector unit may be arranged to determine the spectral location of the photo-luminescence peak within such a spectrum by a process of interpolation or extrapolation, as described above. Once a spectral peak location/position has been determined for received photo-luminescence light, the detector unit may be arranged to determine the temperature of the optical beads (1) from which the light was emitted and, by inference, the temperature of the environment (ocean, atmosphere etc.) within which the beads reside. This may be done by applying the spectral peak position into a formula embodying the temperature dependence of the spectral peak position (see FIG. 4; inset graph), which may be stored within a memory store of the detector unit, and therewith calculating a temperature value. The detector unit may comprise a computer (not shown) comprising a memory storage unit and a processor unit arranged to store the formula, perform the calculation, and output the result. A particular strength of this spectral method is that it does not rely on absolute optical intensities of received light signals—relative spectral intensities are sufficient.

The detector unit 24 may be arranged to calculate both a temperature and a pressure for the environment of the environment (ocean, atmosphere etc.) within which the beads reside. The detector unit may be arranged to determine a relative photo-luminescence value from the received photo-luminescence signal from the optical elements. This may be done by comparing a received signal to a reference value and calibrating the received signal value using the reference value. Examples of calibration include dividing the former by the latter, to obtain a 'relative' signal intensity value. The reference value may be a received optical signal from the same optical element and received contemporaneously with the photo-luminescent signal being monitored. The received reference signal may simply be the retro-reflected component of the output light beam 5. Alternatively, if a second fluorescent material is provided on the optical element, then the reference signal may be the fluorescence response of this reference fluorescent material selected to fluoresce at a wavelength distinct from that of the sensing layer, and to be insensitive to the changes in the physical condition of the monitored environment, thereby to provide a stable reference signal (e.g. a fluorescent dye or the like)

The relative value of the received photo-luminescent signal may then be compared to a plurality of reference values of photo-luminescent signal stored in the memory store of the detector unit. Each reference value corresponds to a pre-measured value of photo-luminescence observed in the beads under a respective one of a plurality of different pressures and temperatures. Examples of a continuum of such reference values is schematically shown in FIG. 4 in respect of multiple temperatures, or FIG. 5 for two example pressures (vacuum pressure, and 1 atmosphere pressure) and a wide range of temperatures, or as shown in FIG. 7 for a range of chlorinity (salinity) values. Other such reference values (not shown) may be stored in respect of other pressures and temperatures as desired. The reference values and their associated pressures/temperatures may be stored in a look-up table for example. A pressure and temperature combination associated with the reference photo-luminescence value substantially matching (or most closely matching) the received (relative) photo-luminescence signal may be assumed to be the pressure and temperature of the environment containing the optical elements (1), and the detector unit may output a pressure/temperature measurement accordingly. Interpolation between, or extrapolation from, reference photo-luminescence values (and their associated pressure/temperature values) may be done if a received (relative) photo-luminescence signal falls between (or beyond) reference values.

If the sensing layer upon an optical element (1) comprises a chlorine-quenchable fluorescent probe (e.g. Lucigenin) such as is discussed above, then salinity may be determined by measuring the chlorine content of the water since this is an abundant constituent, as a result of the presence of salt (NaCl). The detector unit may be arranged to implement an empirical relationship between the salinity (S[%]) of water and its chlorine content (Cl$^-$[%]), or "chlorinity", which may take the form:

$$S[\%]=a_1+a_2 Cl^-[\%]$$

The constants $a_1$ and $a_2$ may be pre-stored in the detector unit. The chlorinity of salt water resulting from its salinity, has a quenching effect on the fluorescence intensity of Lucigenin. Thus, the salinity of water may be measured according to measurement of the extent of this quenching effect (i.e. variation in measured fluorescence intensity is a direct result of variation in Cl$^-$[%]). For example, the measured fluorescence intensity (F) may vary as:

$$F=F_0/\{1+a_3 Cl^-[\%]\}$$

Here $F_0$ and $a_3$ are constants (see FIG. 7).

In this way, the detector unit may be arranged to calculate a value of the temperature and/or pressure and/or salinity of the monitored ocean environment and to out put the result 25. Other known fluorescent Cl$^-$ indicators which may be used include:

6-methoxy-N-(3-sulfopropyl)quinolinium;
N-(ethoxycarbonylmethyl)-6-methoxyquinolinium bromide; 6-methoxy-N-ethylquinolinium iodide.

These materials are readily available to the skilled person. A laser source (22) in the blue/green region is well matched to both the transmission band of seawater, and the absorption bands of sensing materials. For sensing layers with multiple emission wavelengths, such as that shown in FIG. 6 for a combined QD/PtTFPP sensor, it is preferable to use a laser at the shorter blue end of the range in order to allow sufficient wavelength discrimination. The use of a short pulse laser also enables the return signal to be time-gated, further reducing background signal, as well as enabling the range to the retro-reflector to be determined. Examples of compact, suitable solid-state lasers are based on the third harmonic of either the 1.32 µm output of a Nd:YAG laser or the 1.34 µm output of a Nd:YVO$_4$; these generate blue light at 440 nm and 447 nm respectively.

Dual Luminophore Referencing

Dual Luminophore Refeferencing, also known as Dual Lifetime Referencing or Phase Modulation Resolved Fluorescence Spectroscopy, is a method for detecting the luminescence intensity of a luminescent material. Unlike other luminescence intensity detection schemes, it does not rely on direct luminescent intensity measurements which can be susceptible to a variety of interfering factors each of which will influence a directly detected intensity signal. Examples include position changes in the luminescent material relative to the detector, or in the light scattering or turbidity of the medium between the luminescent material and the detector.

Dual Luminophore Referencing (DLR) is a radiometric method whereby a luminescent material is used which has a fluorescent intensity that is dependent upon, or sensitive to, the quenching effect of an analyte material (e.g. chlorine in a water) upon the luminescent material. Two luminophores are present at an analyte sensing region—an 'indicator' luminophore having the analyte sensitivity, and a 'reference' luminophore which is unaffected by the presence of any analyte either because it is inherently unaffected or is protected from being quenched by the analyte.

The indicator luminophore is selected to have a relatively short luminescence decay time ($T_{ind}$) whereas the reference luminophore is selected to have a relatively long luminescence decay time ($T_{ref}$). The indicator and reference luminophores desirably have overlapping excitation spectra so that they can be excited by the same wavelength of incident light (e.g. one common light source).

In use, a sinusoidal excitation signal applied to the two different luminophores causes them to generate two different respective luminescence signals at the analyte sensing region. These two luminescence signals are phase-shifted in time, relative to each other, as is the net luminescence signal resulting from the combination of them. One may obtain a value of the luminescent intensity of the indicator luminophore relative to the luminescent intensity of the reference luminophore by measuring these phase-shifts. Since the luminescent intensity of the reference luminophore is insensitive to the analyte, and changes detected in the luminescent intensity of the indicator luminophore are a direct result of the presence of the luminophore. The signals of both luminophores are equally susceptible to other interferences such as distance, turbidity or scattering effects upon luminescent light signals. Thus, the interferences cancel-out in the relative intensity values obtainable using DLR.

In more detail, when a luminophore is excited by an impulse of light, fluorescent photoemission intensity I(t) of the luminophore, after the pulse has ended, is an exponentially decaying value. For a plurality of luminophores excited in common by the impulse, the overall fluorescent intensity decays as a multi-exponential function I(t)=$\Sigma_i$exp$(-t/\tau_i)$ where $a_i$ and $\tau_i$ are the decaying amplitudes and lifetimes of the $i^{th}$ component luminophores.

In frequency-domain lifetime measurement techniques, such as DLR, a target luminophore is exposed to an excitation light intensity which is modulated harmonically at an angular frequency ω and a modulation degree of $m_E$ where:

$$E(t)=E_0[1+m_E \sin(\omega t)]$$

The periodic excitation causes a given single luminophore of decay lifetime τ to emit fluorescent light F(t) with the same intensity modulation frequency, ω.

However, a phase lag is present in the fluorescence signal due to the finite fluorescence lifetime of the luminophore such that:

$$F(t)=F_0[1+m_F \sin(\omega t-\varphi_F)],$$

having a modulation degree of $m_F$. This arises from the extended effect of the harmonically modulated excitation light upon the instantaneous response (exponential decay) of the luminophores. This extended effect can be determined by considering the instantaneous impulse-response of a luminophore, and convolving that one the extended harmonic excitation, as follows:

$$F(t) = \int_0^t E(t')F_\delta(t-t')dt'$$

Here, $F_\delta$ is the impulse-response of a fluorophore to an impulse of excitation light:

$$F_\delta(t-t')=e^{-(t-t')/\tau}.$$

The convolution integral gives:

$$F(t) = E_0\tau - E_0\tau\left\{\frac{1-m_E\omega\tau}{1+\omega^2\tau^2}\right\}e^{-t/\tau} + \frac{m_E E_0\tau}{1+\omega^2\tau^2}\{\sin(\omega t)+\omega\tau\cos(\omega t)\}.$$

If $\tau \ll t$ then the exponentially decaying middle term in the above expression is negligible and we have:

$$F(t) = E_0\tau + \frac{m_E E_0\tau}{1+\omega^2\tau^2}\{\sin(\omega t)+\omega\tau\cos(\omega t)\}.$$

Using the well-known trigonometric identity that:

$$a\sin(x)+b\cos(x)=c\sin(x+\varphi);\ c^2=a^2+b^2;\ \varphi=\arctan 2(b,a)$$

We may write that for an individual luminophore, the fluorescent response to the harmonic excitation light is:

$$F(t) = E_0\tau + \frac{m_E E_0\tau}{\sqrt{1+\omega^2\tau^2}}\sin(\omega t - \varphi_F);$$

$$\varphi_F = \arctan(\omega\tau),$$

Thus, the response is sinusoidal with a phase lag $\varphi_F$. If there are a plurality of luminophores simultaneously excited in this way, the total response is simply the sum of the individual responses. By using the well-known trigonometric identity (also known as 'Phasor Addition') that:

$$\sum_i a_i \sin(\omega t + \varphi_i) = a\sin(\omega t + \Phi);$$

$$a^2 = \sum_{i,j} a_i a_j \cos(\varphi_i - \varphi_j);$$

$$\tan(\Phi) = \frac{\sum_i a_i \sin(\varphi_i)}{\sum_i a_i \cos(\varphi_i)}.$$

we may write the total response from all luminophores as:

$$F(t)=A_0+A_1\sin(\omega t - \varphi_T),$$

where, $$A_1^2 = \sum_{i,j} F_i F_j \cos(\varphi_i - \varphi_j)$$

and, $$\tan(\varphi_T) = \frac{\sum_i F_i \sin(\varphi_i)}{\sum_i F_i \cos(\varphi_i)},$$

in which each of the $F_i$ terms (or $F_j$ terms) is the constant amplitude $$\left(\frac{m_E E_0 \tau_i}{\sqrt{1+\omega^2\tau_i^2}}\right)$$

of the sinusoidal harmonic term in the $i^{th}$ luminophore response signal, and where $A_0$ is the sum of all the constant terms ($E_0\tau_i$) from each of the i luminophore response signals.

Thus, if a harmonically modulated excitation light is applied simultaneously to an 'indicator' ("1") luminophore and a 'reference' ("2") luminophore, the net fluorescence signal would simply be the sum of the fluorescence signal from each:

$$F(t)=F_1[1+m_1\sin(\omega t-\varphi_1)]+F_2[1+m_2\sin(\omega t-\varphi_2)]$$

Which is itself simply a harmonic function which is the total ("T") of the two contributing fluorescence signals:

$$F(t)=F_T[1+m_T\sin(\omega t-\varphi_T)]$$

Thus, $$F_T[1+m_T\sin(\omega t-\varphi_T)]=F_1[1+m_1\sin(\omega t-\varphi_1)]+F_2[1+m_2\sin(\omega t-\varphi_2)]$$

Applying cosine and sine transforms to each side of this equation yields:

$$A_T\sin(\omega_T)=A_1\sin(\omega_1)+A_2\sin(\omega_2)$$

$$A_T\cos(\omega_T)=A_1\cos(\omega_1)+A_2\cos(\omega_2)$$

Here, $A_i=F_i m_i$ and $\omega_i=\arctan(\omega\tau_i)$.

If $\omega\tau_i \ll 1$, then $\omega_i \approx 0$.

Thus, if the 'indicator' luminophore is selected to have a very short decay lifetime, then $A_1\sin(\varphi_1)\approx 0$ and $A_1\cos(\omega_1)\approx A_1$. Thus, the above equations reduce to:

$$A_T\sin(\varphi_T)=A_2\sin(\varphi_2)$$

$$A_T\cos(\varphi_T)=A_1+A_2\cos(\varphi_2)$$

Dividing the bottom equation by the top one gives:

$$\cot(\varphi_T) = \frac{A_1+A_2\cos(\varphi_2)}{A_2\sin(\varphi_2)} = \cot(\varphi_2)+\left(\frac{A_1}{A_2}\right)\frac{1}{\sin(\varphi_2)}$$

Rearranging this gives:

$$\left(\frac{A_1}{A_2}\right) = (\sin(\varphi_2)) \times \cot(\varphi_T) - \cos(\varphi_2) = M \times \cot(\varphi_T) + C$$

This is a simple linear equation in which a measured phase delay ($\varphi_T$) of the total fluorescence signal is directly proportional to the ratio of the 'indicator' fluorescence intensity and the 'reference' fluorescence intensity. The phase delay ($\varphi_2$) of the 'reference' luminophore is known or can be directly measured from the gradient (M) and intercept (C) value of the straight-line correlation between the directly measured quantity $\cot(\varphi_T)$ of the total fluorescence signal and the analyte-dependent relative fluorescent intensity $$\left(\frac{A_1}{A_2}\right).$$

Of course, because the 'reference' luminophore was selected to be insensitive to the presence of the analyte, the value of $\varphi_2$ remains unchanged and so the values of M and C are constant, and $$\varphi_2 = \arctan\left(\frac{-M}{C}\right).$$

In this way, in summary, Dual Luminophore Referencing (DLR) takes advantage of a phase shift $\varphi_T$ in the combined luminescent response of two luminophores caused by the harmonic amplitude/intensity modulation of an excitation laser light source common to both. One of the luminophores, referred to as the 'indicator' which is sensitive to the presence of the analyte substance, may typically have a fluorescent decay time or the order of nanoseconds, and the other (acting as the 'reference') may have a decay time in the microseconds range. The two luminophores used in DLR typically have similar spectral properties so that they can be excited at the same wavelength, if desired. Their emission may possibly be detected using the same detector, if desired. The phase shift $\varphi_T$ of the overall luminescence return signal from the two luminophores depends on the ratio of intensities of the 'reference' luminophore and the 'indicator' luminophore.

The reference luminophore is preferably arranged to give very slowly changing (e.g. effectively a constant) background signal while the fluorescence of the indicator depends on the analyte concentration. Therefore, the phase shift $\varphi_T$ of the combined, measured, fluorescence signal directly reflects the intensity of the indicator luminophore and, consequently, the analyte concentration.

For measurements employing Dual Luminophore Referencing (DLR) techniques, the laser light source (22) may be sinusoidally modulated in intensity (frequency-domain). A low-pass filter with a cut-off wavelength of 530 nm may be used to filter received optical signals (6) from the illuminated optical elements (1). The detector unit (24) may be arranged to measure $\varphi_T$, the phase angle of the overall signal and optionally $\varphi_2$, the phase angle of the reference luminophore (if not already known), and to apply the above equation to generate a value for the relative intensity ratio of $$\left(\frac{A_1}{A_2}\right).$$

The detector unit may then use this result by defining a parameter value $$F = \left(\frac{A_1}{A_2}\right).$$

This parameter value may be inserted in the Stern-Volmer equation (e.g. $F_0/F\{1+a_3Cl^-[\%]\}$) and the detector unit may be arranged to invert that Stern-Volmer equation to derive a value for $Cl^-[\%]$ and from that a measure of salinity (e.g. $S[\%]=a_1+a_2Cl-[\%]$).

Figure 8:
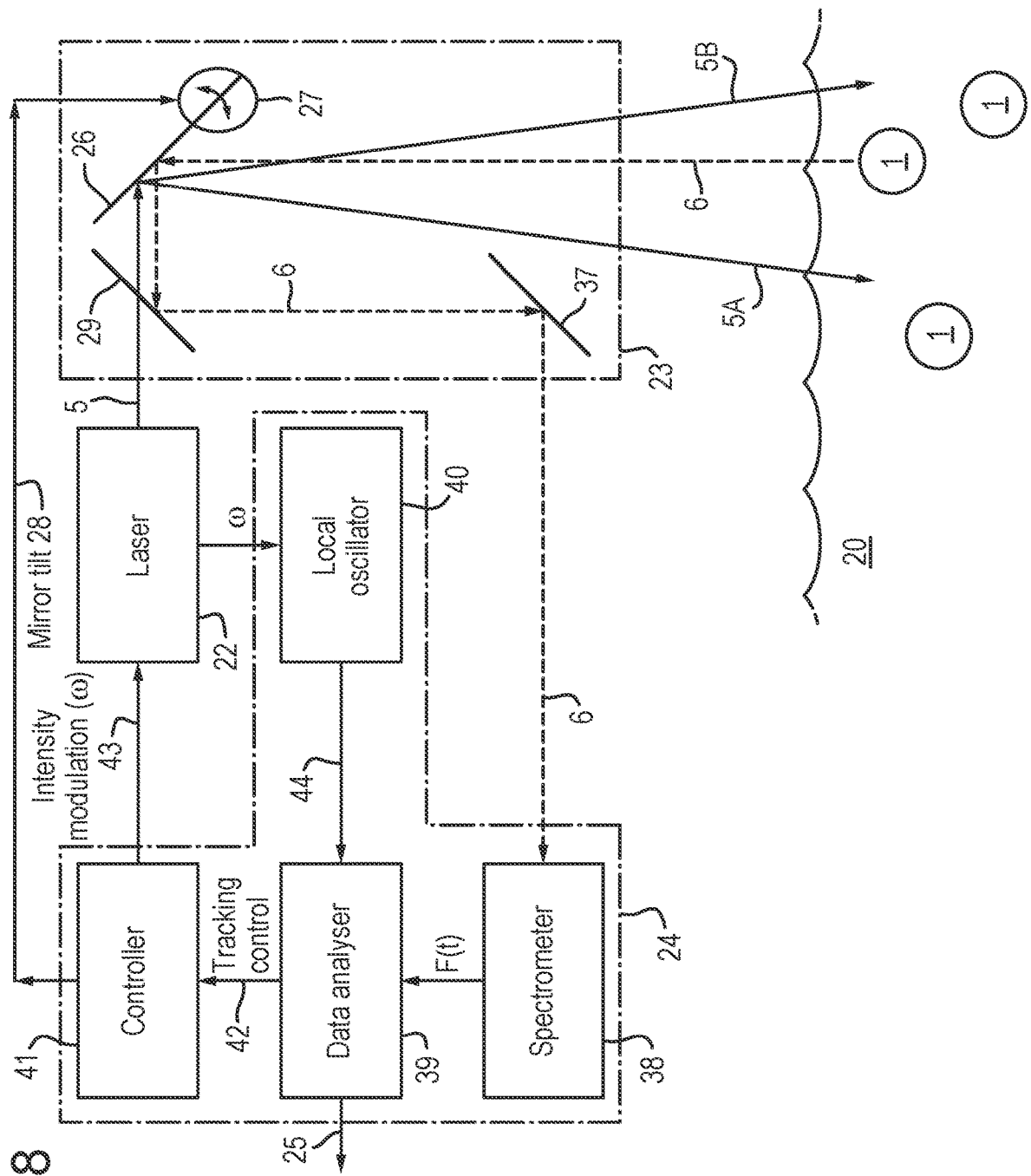
FIG. 8 schematically shows a detailed example of a system of FIG. 3 according to a preferred embodiment employing Dual Luminophore Referencing (DLR)
Figure 9:
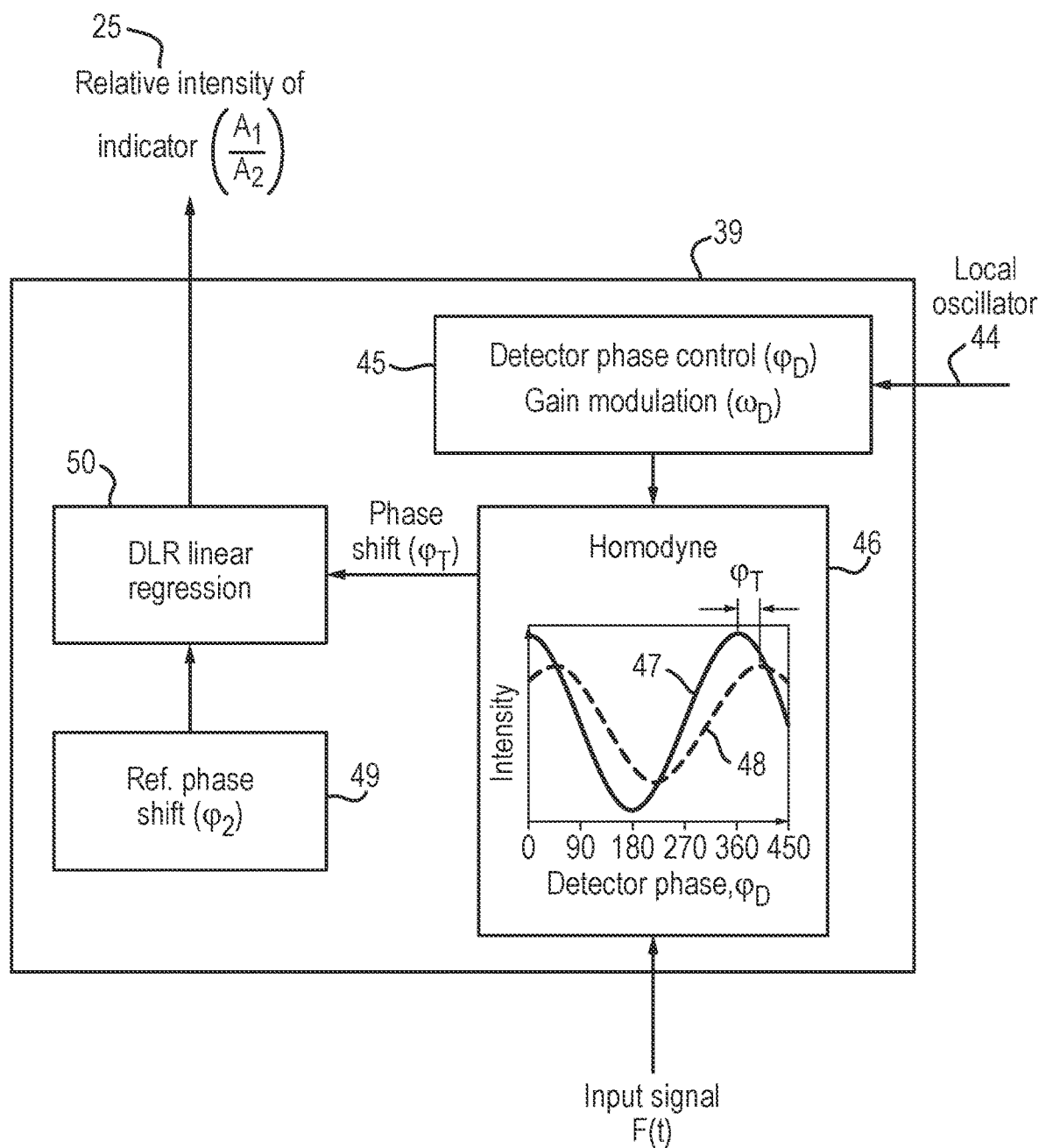
FIG. 9 schematically shows a component part of the system of FIG. 8 in more detail.

FIG. 8 and FIG. 9 schematically show a more detailed example of a system (21) for remotely measuring properties of a monitored environment as has been described more generally with reference to FIG. 3. The embodiment illustrated in FIGS. 8 and 9 is intended to apply the technique of DLR as discussed above. This is applicable whatever indicator luminophore is used, and for what ever physical property of the monitored environment, provided it is used in conjunction with a reference luminophore present anywhere upon or within the optical elements (1) to be illuminated by the light source (22) of the system.

The front-end optics unit (23) comprises a tracking output mirror 26 arranged to receive excitation light (5) from a laser light source (22) and to reflect the received light in a desired direction determined by the particular tilt angle of the tracking output mirror. The tilt angle is controlled by a tilt control unit (27) arranged to implement a desired mirror tilt angle receive in accordance with a mirror tilt signal (28) received thereby from a controller unit (41) of the detector unit (24). The change in direction (5A, 5B) of the excitation output light reflected by the tracking output mirror, when tilted at two different mirror orientations, is schematically in FIG. 8. The laser unit is controlled by a modulation control signal (43) from a controller unit (41) to generate a light output (5) having an intensity that is modulated with a sinusoidal modulation having a modulation angular frequency ($\omega$) of about 45 kHz. An illuminated optical element (1) bears an indicator luminophore (e.g. Quantum Dot, PtTFPP, Lucigenin, etc.) and a reference luminophore (e.g. Ru(dpp)) returns a sinusoidally modulated photo-luminescent light signal (6) containing light originating from both the indicator and the reference luminophores. The returned signal (6) also contains a component of directly retro-reflected excitation light which has reflected from the optical elements without being absorbed by the indicator or reference luminophores there. In alternative embodiments, the laser unit (22) may comprise a second laser arranged to emit a second wavelength of light having an intensity that is modulated with a sinusoidal modulation having a modulation angular frequency ($\omega_R$) which may preferably be equal to the modulation angular frequency of the excitation light (i.e. $\omega_R=\omega$, e.g. about 45 kHz). This second laser light source may be used specifically for deriving a value of the range (R) to the optical elements.

The returned luminescence signal (6) is phase-shifted by a phase lag ($\omega_T$) with respect to the excitation light (5) due to the differing luminescence decay lifetimes of the indicator and reference luminescent materials, whereas the retro-reflected excitation light is phase-shifted by a phase lag ($\omega_R$) with respect to the excitation light (5) due to the range (R) of the illuminated optical element (1) from the illuminating apparatus (21).

The front-end optics unit (23) is arranged to receive the returned luminescence signal (6) at the tracking output mirror (26), and comprises a pair of intermediate mirrors (29, 37) arranged to reflect the received return signal (6) to an optical input of a spectrometer unit (38). The spectrometer unit is arranged to separate the photo-luminescent component of the signal from the directly retro-reflected component, and to output the separated signal components (F(t)) to a data analyser unit (39). A dichroic mirror (not shown) within the spectrometer unit may be used for this purpose, being transmissive to light of a wavelength excluding that of the excitation light (e.g. λ=532 nm) but including the photo-luminescent light (e.g. λ>532 nm), and being reflective to light of a wavelength including that of the excitation light but excluding the photo-luminescent light. The photo-luminescent component of the signal is then analysed according to the DLR method to determine a relative luminescence intensity of the indicator luminophore relative to the reference luminophore, and the directly retro-reflected component is analysed to determine a range value (R).

The directly retro-reflected component is compared to a local oscillator signal (44) generated by a local oscillator unit (40) which has the same angular frequency and phase as that of the excitation light generated by the laser unit (22). Using any suitable technique readily available to the skilled person (e.g. homodyne detection), the phase lag ($\varphi_R$) with respect to the excitation light (5) is determined and the range value calculated by the data analyser according to the following relation:

$$R = \frac{2c\varphi_R}{\omega}$$

Here c is the speed of light in a vacuum, and ω is the angular frequency of the modulation applied to the excitation light (5). If a second laser is employed for range-finding purposes, as described above, then term w in the above equation is replaced with $\omega_R$.

This range value may be used by the data analyser to calibrate (e.g. normalise) the received photo-luminescent intensity value in embodiments in which DLR is not used, if desired, to give an intensity value which is, in principle, not influenced by the range (R) to the optical element.

The photo-luminescent component of the returned signal (6) is compared to the local oscillator signal (44) generated by a local oscillator unit (40) which has the same angular frequency and phase as that of the excitation light generated by the laser unit (22). Using a homodyne detection method, the phase lag ($\varphi_T$) of the photo-luminescent light with respect to the excitation light (5) is determined due to the differing luminescence decay lifetimes of the indicator and reference luminescent materials, and a relative luminescence intensity value (25) is output from which the physical property of the monitored environment (1) may be determined as described above. The homodyne determination of the relative luminescence intensity value is described in more detail with reference to FIG. 9.

Homodyne Detection

In DLR, an intensity of an 'indicator' luminophore can be obtained from measurements of the phase lag of the 'indicator' emission as compared to the excitation light. The high-frequency fluorescence signal F(t) is not measured directly in the time domain but instead converted to a low-frequency signal. This is accomplished using a homodyne detector. This employs a frequency mixing phenomenon that is well-known.

In the homodyne detection method, the excitation light intensity and the gain (G(t)) of the luminescence signal photodetector are modulated harmonically at the same frequency. The phase ($\varphi_D$) of the detector gain modulation is controllably varied. At a certain phase difference ($\varphi_T$-$\varphi_D$) between the detector gain curve and the modulated excitation, the measured signal (S(t)) is the real-time product of the fluorescence emission and detector gain:

$$S(t) = \{F(t) \cdot G(t)\} \propto F_T(1 + m_T \cos(\varphi_T - \varphi_D))$$

In a homodyne system, S is measured at a series of phase steps in the detector phase angle ($\varphi_D$) covering 360 degrees, and at each phase setting the detector signal is integrated for a time period much longer than the period of the harmonic modulation applied to the excitation light and the detector gain, thereby averaging the signal. The resulting homodyne signal or phase-modulation diagram (an integral over time t) exactly preserves the phase lag ($\varphi_T$) and the demodulation of the high frequency fluorescence emission, and can be directly translated to a fluorescence intensity for the Indicator' luminophore using the DLR method described above.

FIG. 9 schematically illustrates the data analyser unit (39) is shown in detail.

The data analyser includes a homodyne unit arranged to implement the above modulation of the photo-detector gain in order to produce a homodyne signal (dashed curve, 48) of the total fluorescence emission (S(t)), showing a phase lag ($\varphi_T$). This homodyne signal is shown relative to the signal one would see for a zero-lifetime reference luminophore (solid curve, 47).

In detail, the data analyser unit comprises a homodyne unit (46) containing a luminescence signal photo-detector (not shown) arranged to receive the input luminescence signal (F(t)) from the spectrometer unit, and to generate an electrical signal in proportion to the intensity of that luminescence signal. A gain control unit (45) is arranged to receive as an input the angular frequency (ω) of the sinusoidal intensity modulation applied to the excitation laser light (5), and therewith to modulate the gain (G(t)) of the luminescence signal photo-detector harmonically as described above. The gain control unit is also arranged to sweep through successive values of detector phase angle ($\varphi_D$) covering 360 degrees. The homodyne unit (46) is arranged to mix the time-varying input luminescence signal with the time-varying gain of the luminescence signal photo-detector to generate an output signal S(t)={F(t)·G(t)} as illustrated in the dashed curve (48) of FIG. 9.

The phase lag ($\varphi_T$) is determined accordingly, and output (44) to a DLR linear regression unit (50) which is arranged to implement the equation:

$$\frac{A_1}{A_2} = M \cot(\varphi_T) + C$$

as described above in order to derive a relative intensity value ($A_1/A_2$) for the indicator luminophore. A reference phase shift unit (49) contains pre-stored values for the constants "M" and "C" of the above linear equation, which can be derived from the known constant phase lag associated with the reference luminophore M=sin($\varphi_T$) and C=−cos($\varphi_T$). The data analyser may be arranged to calculate a monitored property (e.g. pressure, temperature, salinity etc.) of the monitored environment by applying the relative intensity value to the known relations between that quantity and the physical properties of the reference luminophore being used—as discussed above. For example, the detector unit may define a parameter value $$F = \left(\frac{A_1}{A_2}\right).$$

The data analyser may be arranged to invert the Stern-Volmer equation:

$$F_0/F\{1+a_3 Cl^-[\%]\}$$

to derive a value for Cl$^-$[%] and from that a measure of salinity (e.g. S[%]=$a_1$+$a_2$Cl$^-$[%]), and output the result (25).

This relative intensity value may be output (42) by the data analyser for input to the controller unit (41) of FIG. 8, for use by the controller unit in control of the tracking output mirror (26). The controller unit may be arranged to compare a contemporaneous value of the relative intensity signal with an immediately preceding such value, previously input to it from the data analyser unit, and to determine whether the former is greater than the latter. If the former is not greater than the latter, then the controller unit is arranged to issue a mirror tilt signal (28) to the tilt control unit (27) to implement a small change in the mirror tilt angle (e.g. a degree, arc-minute or arc-second, or a fraction/multiple thereof) and to subsequently compare the next contemporaneous value of the relative intensity signal with the immediately preceding such value. If the intensity value is increased the mirror is moved by a further tilt angle which is an increase in the previous tilt angle, otherwise, the small change in tilt angle is reversed to return the mirror to its earlier position. A new small change in mirror tilt angle is then assessed in this way in order to find the tilt angle which optimises the relative intensity signal. This is applied to each of two orthogonal tilt directions, to allow a movement of the mirror in three dimensions. Of course, each new tilt direction directs the excitation laser light bean (5) in a new direction (e.g. direction 5A to 5B) towards the optical elements (1) in the monitored environment. Thus, the controller unit may control the tracking output mirror such that the output laser beam (5) effectively tracks the optical elements (1).

In embodiments omitting the sensing layer, the detector unit may be arranged to determine the spectral profile of the returned signal and therefrom determine estimates of the presence and/or concentration of particulate or molecular species in the sensed environment, which may include the space between the retro-reflective beads and the detector (e.g. the atmosphere, body of water), according to techniques known to the skilled person. For example, by measuring the spectrum of light received at the detector from the retro-reflective bead(s), acting as a remote light source, and the intensity of light within specified spectral ranges, spectral absorption estimates may be made which allow identification of pollutants.

The embodiments described herein are presented so as to allow a better understanding of the invention, and are not intended to limit the scope of the inventive concept of the invention. Variations, modifications and equivalents to the embodiments described herein, such as would be readily apparent to the skilled reader, are intended to be encompassed within the scope of the invention.

The invention claimed is:

1. A system for remotely sensing light emanating from within a monitored environment, the system comprising:
   one or more retro-reflective optical elements bearing an optically reflective optical coating upon a surface thereof and positionable within the environment to be monitored;
   a light source arranged to direct a beam of light at the optical element(s);
   a detector arranged to receive from the optical element(s) light returned by the optical coating in response to the beam of light and to detect a property of the monitored environment according to said returned light, the property comprising one or more of temperature, pressure, and/or salinity;
   wherein at least one of the one or more optical element(s) includes a body comprising a focuser part of positive optical power partly surrounded by a reflector part separated therefrom and connected thereto across an open spacing;
   wherein the optical coating is arranged over an outer surface of the reflector part thereat to receive light which has been at least partially converged by the focuser part for subsequent retro-reflection.

2. The system according to claim 1 in which the optical element(s) bears a photo-luminescent material over a surface of the reflector part and/or the focuser part, and the detector is arranged to receive from the optical element(s) photo-luminescent light generated by the photo-luminescent material in response to the beam of light, wherein the photo-luminescent material is arranged such that said photo-luminescent response is variable according to changes in a property of the photo-luminescent material inducible by changes in said property of the monitored environment.

3. The system according to claim 2 wherein at least one of:
   said photo-luminescent material is located on the reflector part between the focuser part and the optical coating of the reflector part; and/or
   said photo-luminescent material is exposed and directly accessible by said environment.

4. The system according to claim 2 in which at least one of the photo-luminescent material and/or the focuser is coated by anti-reflective optical coating.

5. The system according to claim 2 in which the photo-luminescent material is responsive to the beam of light to generate photo-luminescent light comprising light of an optical wavelength differing from the optical wavelength(s) of light comprising the beam of light.

6. The system according to claim 2 in which the photo-luminescent material comprises a Quantum Dot material, and the property of the monitored environment is temperature.

7. The system according to claim 6 in which said detector is arranged to detect a value of the optical wavelength at which a peak in said photo-luminescent response occurs, to calculate a value representing a temperature of the monitored environment according to said optical wavelength value, and to output the result.

8. The system according to claim 2 in which said photo-luminescent material comprises a platinum meso-tetra(pentafluorophenyl)porphine (PtTFPP), and the property of the monitored environment is pressure and/or temperature.

9. The system according to claim 8 in which the properties of the monitored environment are temperature and pressure.

10. The system according to claim 8 in which said detector is arranged to detect a value of the intensity of said photo-luminescent response, to calculate a value representing a temperature and/or a pressure of the monitored environment according to said intensity value, and to output the result.

11. The system according to claim 2 in which said photo-luminescent material comprises lucigenin, and the property of the monitored environment is salinity.

12. The system according to claim 11 in which said detector is arranged to detect a value of the intensity of said photo-luminescent response, to calculate a value representing a salinity of the monitored environment according to said intensity value, and to output the result.

13. The system according to claim 2 in which said detector is arranged to detect a value of the optical wavelength at which a peak in said photo-luminescent response occurs, to calculate a value representing a temperature of the monitored environment according to said optical wavelength value, and to output the result.

14. The system according to claim 2 in which said detector is arranged to detect a value of the intensity of said photo-luminescent response, to calculate a value representing a temperature and/or a pressure of the monitored environment according to said intensity value, and to output the result.

15. The system according to claim 2 in which said detector is arranged to detect a value of the intensity of said photo-luminescent response, to calculate a value representing a salinity of the monitored environment according to said intensity value, and to output the result.

16. A method for remotely sensing light emanating from within a monitored environment to detect a property of the monitored environment, the method comprising:
receiving, at a detector, from one or more retro-reflective optical elements light returned by an optically reflective optical coating in response to a beam of light being directed at the optical element(s), the optical elements bearing the optical coating upon a surface thereof and positionable within the environment to be monitored; and,
detecting, by the detector, a property of the monitored environment according to said returned light, the property comprising one or more of temperature, pressure, and/or salinity;
wherein an individual optical element includes a body comprising a focuser part of positive optical power partly surrounded by a reflector part separated therefrom and connected thereto across an open spacing, and wherein the optical coating is arranged over an outer surface of the reflector part thereat to receive light which has been at least partially converged by the focuser part for subsequent retro-reflection.

17. The method according to claim 16 in which the optical element(s) bears a photo-luminescent material over a surface of the reflector part and/or the focuser part; and the light received by said detector includes photo-luminescent light generated by the photo-luminescent material in response to the beam of light, wherein the photo-luminescent material is arranged such that said photo-luminescent response is variable according to changes in a property of the photo-luminescent material inducible by changes in said property of the monitored environment.

18. The method according to claim 17 in which said detecting includes one or more of:
detecting a value of the optical wavelength at which a peak in said photo-luminescent response occurs, to calculate a value representing a temperature of the monitored environment according to said optical wavelength value, and to output the result;
detecting a value of the intensity of said photo-luminescent response, to calculate a value representing a temperature and/or a pressure of the monitored environment according to said intensity value; and/or
detecting a value of the intensity of said photo-luminescent response, to calculate a value representing a salinity of the monitored environment according to said intensity value.

19. A system for remotely sensing light emanating from within a monitored environment, the system comprising:
a retro-reflective optical element positionable within the environment to be monitored;
a light source arranged to direct a beam of light at the optical element; and
a detector arranged to receive from the optical element light returned by the optical element in response to the beam of light;
wherein said optical element includes a body comprising (i) a focuser part of positive optical power, (ii) a reflector part partially surrounding the focuser part and at least in part separated from the focuser part by an open spacing, and (iii) one or more spacers connected to both the focuser part and the reflector part,
wherein the optical element bears a photo-luminescent material over at least a part of a surface of the reflector part,
wherein at least a part of the photo-luminescent material and/or at least a part of the focuser part is coated by anti-reflective optical coating, and
wherein the photo-luminescent material arranged over at least the part of the surface of the reflector part is to (i) receive light which has been at least partially converged by the focuser part and (ii) retro-reflect the received light.

20. The system according to claim 19 in which said detector is arranged to detect a property of the monitored environment according to said returned light, the property comprising one or more of temperature, pressure, and/or salinity.

* * * * *